(12) United States Patent
Kozakai et al.

(10) Patent No.: US 6,494,365 B1
(45) Date of Patent: Dec. 17, 2002

(54) CARD ISSUING DEVICE AND METHOD

(75) Inventors: Masahiro Kozakai, Nagano (JP);
Mitsuo Yokozawa, Nagano (JP);
Kiyotsugu Takasawa, Nagano (JP);
Noboru Ueno, Nagano (JP)

(73) Assignee: Sankyo Seiki Mfg. Co. Ltd., Nagano (JP)

( * ) Notice: Subject to any disclaimer, the term of this patent is extended or adjusted under 35 U.S.C. 154(b) by 0 days.

(21) Appl. No.: 09/377,450

(22) Filed: Aug. 19, 1999

(30) Foreign Application Priority Data

Aug. 20, 1998 (JP) .......................................... 10-234744
Sep. 24, 1998 (JP) .......................................... 10-270140

(51) Int. Cl.⁷ ................................................ G06K 5/00

(52) U.S. Cl. ...................................... 235/380; 235/492

(58) Field of Search ................................ 235/380, 381, 235/383, 385, 492, 493; 705/41, 28

(56) References Cited

U.S. PATENT DOCUMENTS 5,743,429 A * 4/1998 Morofsky ....................... 221/7
5,814,796 A * 9/1998 Benson et al. ............... 235/375
6,129,275 A * 10/2000 Urquhart et al. ............ 235/381

FOREIGN PATENT DOCUMENTS

EP          0905659       * 3/1999  ........... G07F/11/14

* cited by examiner

Primary Examiner—Karl D. Frech
Assistant Examiner—Daniel St. Cyr
(74) Attorney, Agent, or Firm—Hogan & Hartson, LLP

(57) ABSTRACT

A card issuing device and method capable of handling a plurality of types of cards with a single card extracting and moving mechanism having two motors. The device has a plurality of card stackers each for storing a plurality of cards, and a card extracting and moving mechanism movably provided for extracting cards one at a time from any one of the card stackers. A card reader for recording or reading information on or from the card, an engraving/embossing device for marking characters on the card, and a topper mechanism for applying color to the marked characters are provided. A waste card receiver is also provided and is driven by the same motors that drive the card extracting and moving mechanisms. Correction of card inclination effect can be performed so that the marked characters for a row parallel to a desired edge of the card even when the card is held at an angle with respect to the moving direction during the marking process. The correction is carried out by measuring the degree of inclination of the card, and moving the card in a direction perpendicular to the moving direction of the marking before marking each subsequent character, the amount of the perpendicular movement being dependent on the measured degree of inclination of the card.

15 Claims, 21 Drawing Sheets

CARD ISSUING DEVICE AND METHOD

BACKGROUND OF THE INVENTION

1. Field of the Invention

The present invention relates to a card issuing device and a method for issuing a card. In particular, it relates to a card issuing devices having a plurality of card stackers for handling different types of cards.

2. Description of the Related Art

In a conventional card issuing device, a mechanism is provided for delivering cards to a card stacker stocked with many cards and a card is issued by delivering a card from the card stacker and carrying out a specified recording on the card in a card reader. In a card issuing device provided with a plurality of card stackers, there is a mechanism that moves the plurality of card stackers sequentially on one roller mechanism which delivers the cards and moves the next card stacker onto the card delivery roller mechanism when all the cards in one card stacker have been delivered. Technology capable of handling the same type of cards in a large volume is known (Japanese Kokai Patent Application No. Hei 3-294985).

Prior card issuing devices are capable of extracting one card from a card stacker stocked with cards, and then issuing the card after it has been subjected to a specified processing. This process includes a marking process for marking characters (including codes, symbols and the like) by applying irregularities to the card, such as by engraving, embossing, etc., and a topper process for applying colors to the characters.

In the marking process, concaving processes (engraving) or convexing processes (embossing) of a specified shape are executed on the card surface by applying pressure from the front or back of the card at specified positions using a known card marking device. To transport the card to the marking position of the marking device, the card is placed in a card holding member such as a carriage. Embossing or other processes are subsequently executed as shown in FIG. 33(A).

Another type of conventional card issuing device has a plurality of card stackers for handling a plurality of cards, and is equipped with a card delivery mechanism for each card stacker. In such a device, the plurality of card delivery mechanisms are not always used simultaneously and therefore constitute duplicate structures. This leads to complex structures, large device sizes, and increased manufacturing cost.

On the other hand, in a conventional card issuing device capable of handling a large volume of the same type of cards by moving a plurality of card stackers arranged in a series, a large dead space is created, increasing the size of the device. In addition, even though a plurality of card stackers are provided, the same type of cards are stocked in the plurality of card stackers, and the device cannot handle different types of cards.

When marking surface irregularities of a specified shape on a card, marking is done while the card is inside a card holding member. This marking must to be done parallel to an edge of the card. However, when marking while moving the card, it is difficult to maintain a perfect degree of parallelism between the edge of the card and the moving direction. When marking is done while not maintaining a perfect degree of parallelism, slanted marking results as indicated in FIG. 33(B), and when the mark length is long or when making marks near an edge of the card, the slanting is clearly visible and results in a low-quality or defective product. Accurate correcting devices have been used to correct the inclination of the card, which makes the device complex, large and costly to produce.

SUMMARY OF THE INVENTION

Accordingly, the present invention is directed to a card issuing device that substantially obviates one or more of the problems due to limitations and disadvantages of the related art.

It is an object of a preferred embodiment of the present invention to provide a card issuing device that can handle a plurality of types of cards, especially such a device that is compact, simple and easy to manufacture.

According to one aspect of the present invention, a card issuing device comprises a card stacker part having a plurality of card stackers arranged in a row, each card stacker being stocked with a plurality of cards and having a card supply part at the bottom, a card extracting and moving mechanism movably provided for extracting cards from the card supply parts of the plurality of card stackers, a card reader for recording specified information on the card and issuing the card from a card issuing port. The card issuing device extracts one card with the card extracting and moving mechanism from the card stackers, and issues the card from the card issuing port after recording information on the card. A card can be extracted from any one of the plurality of card stackers. Consequently, the device can handle different types of cards, or a large quantity of the same type of cards. Since the plurality of card stackers share a common card extracting and moving mechanism, the structure is simplified and the size of the device is minimized.

According to another aspect of the present invention, a method of correcting the effect of inclination of the card during the card marking process is provided. The degree of inclination or the slanting of the extracted card is determined by detecting the positions of a plurality of edge portions of the card with a sensor. Based on this inclination, the marking direction is corrected by correcting the position of the card during the marking process to offset the effect of the card inclination. As a result, the row of characters marked on the card can be made parallel to the edge of the card even if the card is slanted. This eliminates the need to provide a separate device for correcting the effect of card inclination.

These and other aspects, features and advantages of the present invention will be better understood by studying the detailed description in conjunction with the drawings and the accompanying claims.

BRIEF DESCRIPTION OF THE DRAWINGS

FIG. 22 shows the relationship between each link and pin of the card holder in FIG. 21.

FIG. 32 is a figure showing the scheme of the card movement in the present invention.

FIG. 33 illustrates card marking methods.

DETAILED DESCRIPTION OF THE PREFERRED EMBODIMENTS

Figure 1:
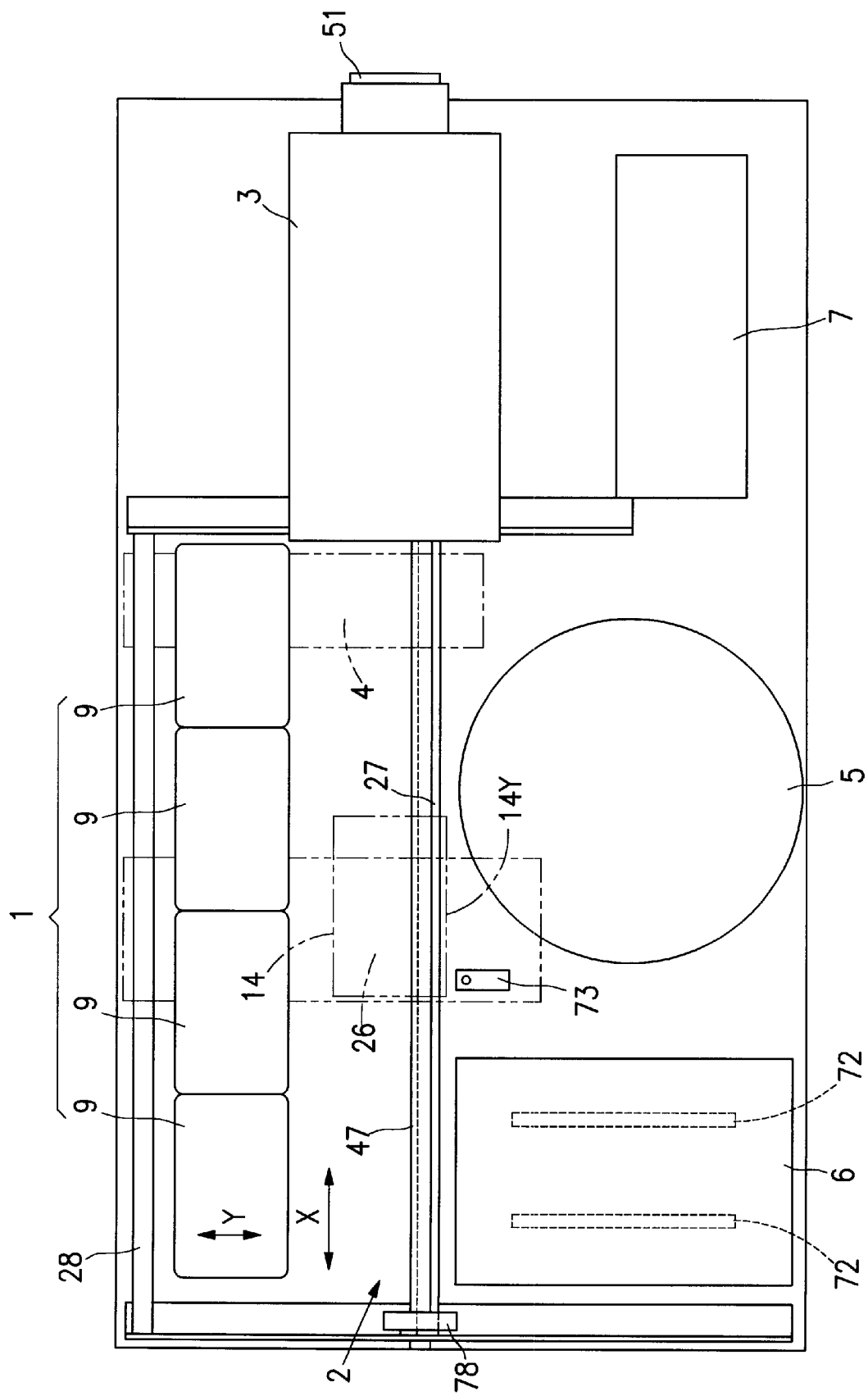
FIGS. 1–4 are schematic top, front, left side and right side views, respectively, of a card issuing device according to an embodiment of the present invention.

The preferred embodiments of the present invention will be described with reference to the drawings.

A card issuing device according to an embodiment of the present invention is shown in FIGS. 1–4. A card issuing device is provided with a card stacker part 1, a card extracting and moving mechanism 2, a card reader 3, a waste card receiver 4, an engraving/embossing device 5, a topper mechanism 6, and a control part 7.

Figure 5:
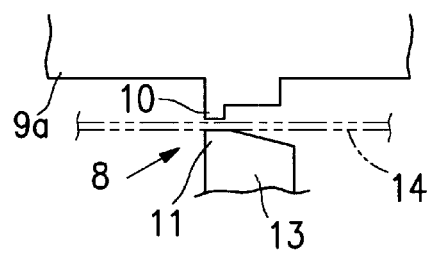
FIG. 5 is a front view of the card supply part formed on the card stacker in the card issuing device.

The card stacker part 1 has card stackers 9 each storing a plurality of cards. Each card stacker 9 has a card supply part 8 at the bottom end. In this embodiment, four card stackers 9 are arranged in the longitudinal (X) direction, and the card stackers are arranged with the card supply parts 8 lined up on the same plane so that cards can be extracted in the same direction (e.g., the downward Y direction in FIG. 1). Different types of cards can be placed in the card stackers 9, or the same type of cards can be placed in all card stackers. Each card stacker 9 is resupplied with cards from above. Referring to FIG. 5, each card supply part 8 has a convex part 10 provided at the bottom end of a side wall 9a in the interior side of the card stacker 9 (in FIG. 1, the engraving/embossing mechanism 5 side), and a convex part 11 of a card receiving block 13. A gap smaller than the thickness of two cards and larger than the thickness of one card is formed between the convex parts 10 and 11. Therefore, two or more cards in the card stacker 9 cannot pass through the card supply part 8 simultaneously, and the cards within each card stacker are extracted one at a time.

Figure 2:
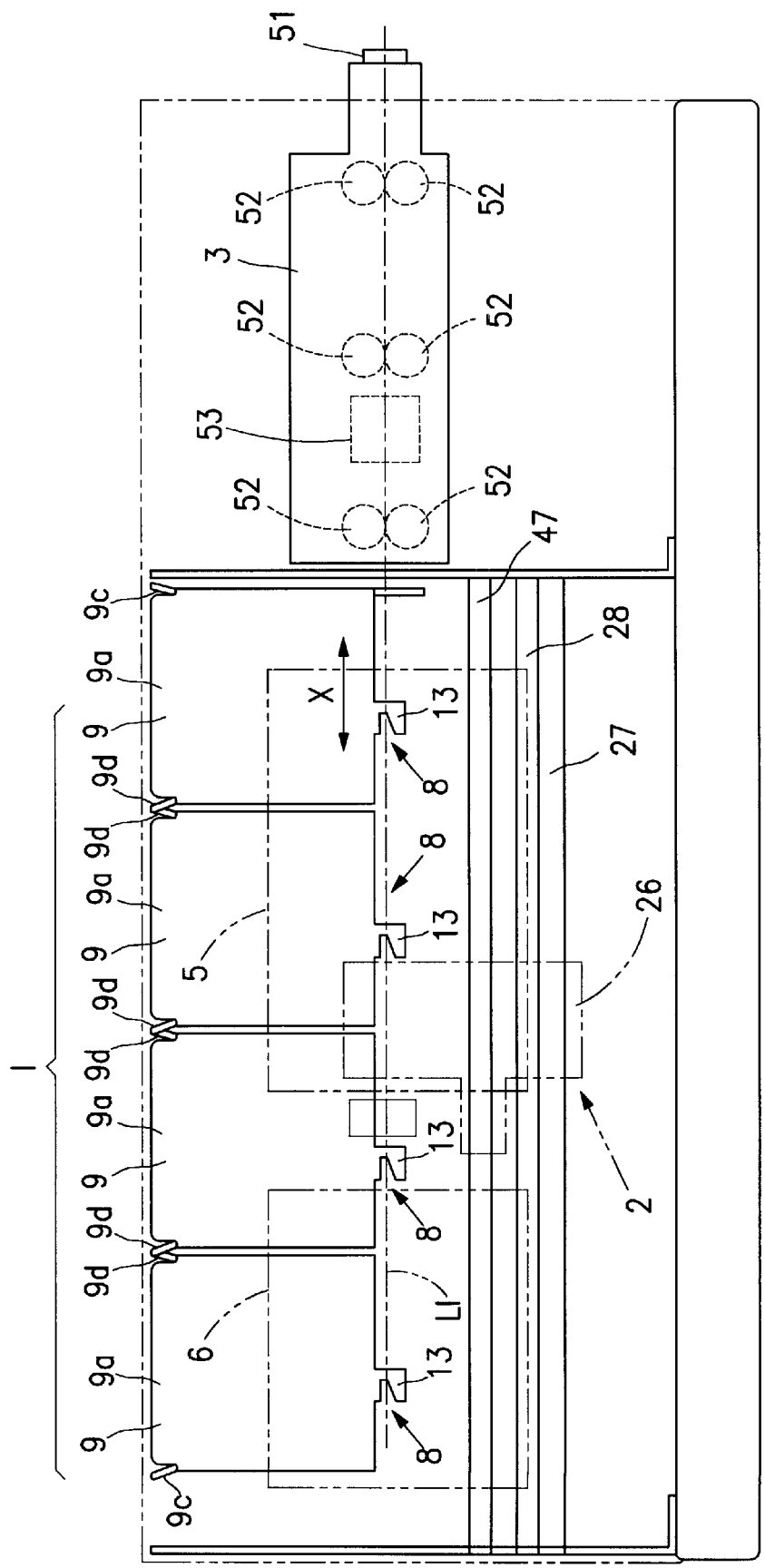
Figure 6:
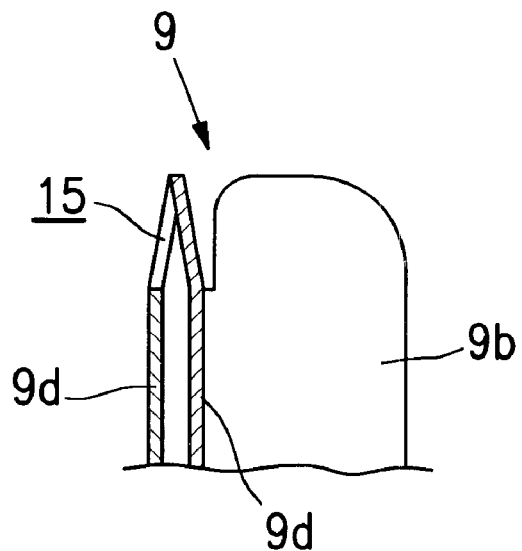
FIGS. 6 and 7 are cross-sectional and front views, respectively, of the side wall arranged along the adjacent card stacker on the exterior of the side walls of a card stacker in the card issuing device.
Figure 7:
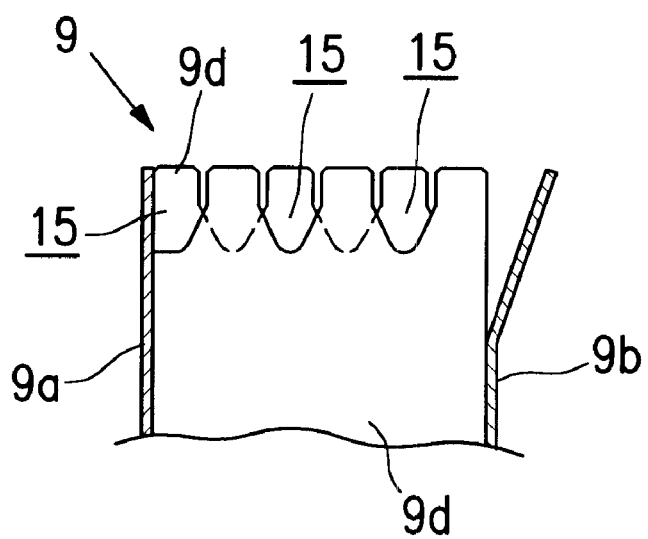

The top parts of side walls of each card stacker 9 expand into a funnel shape as shown in FIG. 2. With regard to side walls 9c on the two ends in the longitudinal direction of the card issuing device and side wall 9b facing the exterior of the card issuing device (i.e., opposite the engraving/embossing mechanism 5 in FIG. 1), the top part can simply be expanded into a funnel shape by bending it towards the outside. But it is necessary to prevent interference of the bent parts with side walls 9d located between adjacent card stackers 9. For this purpose, the top part of each side wall 9d located between adjacent card stackers 9 is cut out. The cut out portions of two adjacent side walls 9d are offset and the top part of adjacent side walls 9d are bent to the corresponding cut out portion 15 as shown in FIGS. 6 and 7. By bending the top parts using the offset cut out portions, two adjacent side walls 9d can be arranged closely while forming the funnel shapes, and a plurality of card stackers 9 can be arranged compactly. By expanding the top parts of side walls 9a–9d of the card stackers 9, refilling cards in the card stackers can easily be done.

Figure 8:
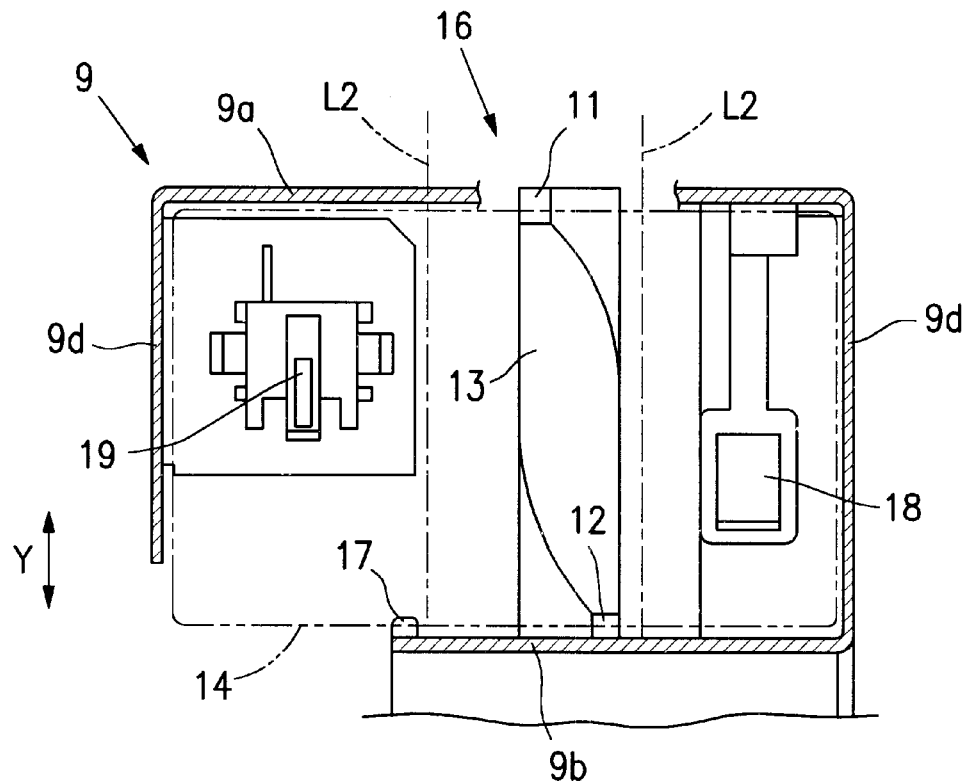
FIG. 8 is a top view showing the card receiver of the card issuing device.
Figure 14:
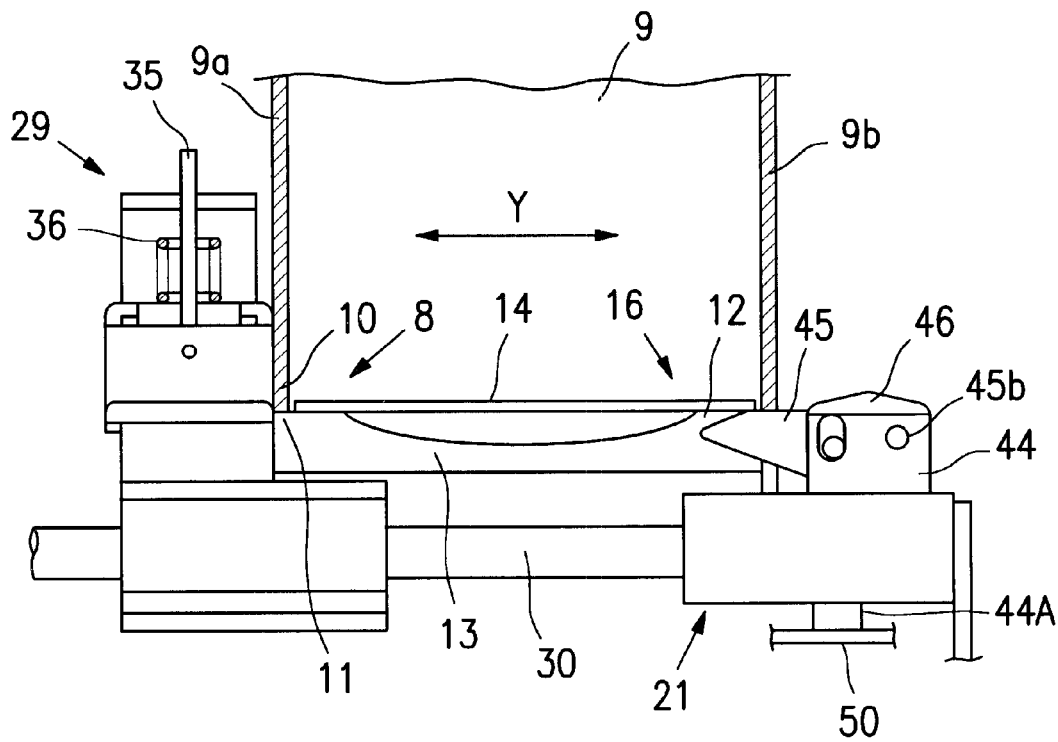
FIG. 14 is a front view showing the card extractor and the card holding member of the card issuing device.

A card receiver 16 is provided at the bottom of each card stacker 9 as shown in FIGS. 8 and 14. The card receiver 16 receives a card 14 from the bottom side at three locations along the card delivery direction (upward the direction in FIG. 8). As shown in FIG. 8, the card receiver 16 has a card receiving block 13 having an interior convex part 11 positioned at the bottom end of side wall 9a on the inside of the card stacker 9, an exterior convex part 12 positioned at the bottom end of the side wall 9b on the exterior of the card stacker 9, and convex part 17 attached to the bottom end of side wall 9b on the exterior. The card receiving block 13 is formed with the convex parts 11 and 12 by cutting the top face of, for example, an aluminum block. By thus receiving a card at one location (convex part 11) in the interior side and two locations (convex parts 12 and 17) on the exterior side of each card stacker 9, namely, three locations spaced apart in the card delivery direction and two locations at the front and rear of the card, the interior convex part 11 reliably supports the inside edge of the card even if the card is curved, and can pass the card reliably through the gap of the card supply part 8.

Numeral 18 in FIG. 8 denotes a sensor which detects the IC contact point provided on the card, and detects whether or not the orientation of the card is appropriate by detecting the IC contact point provided on the front face of the card from the back face side of the card. Also, numeral 19 denotes a sensor that detects the presence or absence of the card. The sensors 18 and 19 are attached to the bottom end of the side walls 9a–9d of each card stacker 9.

Figure 10:
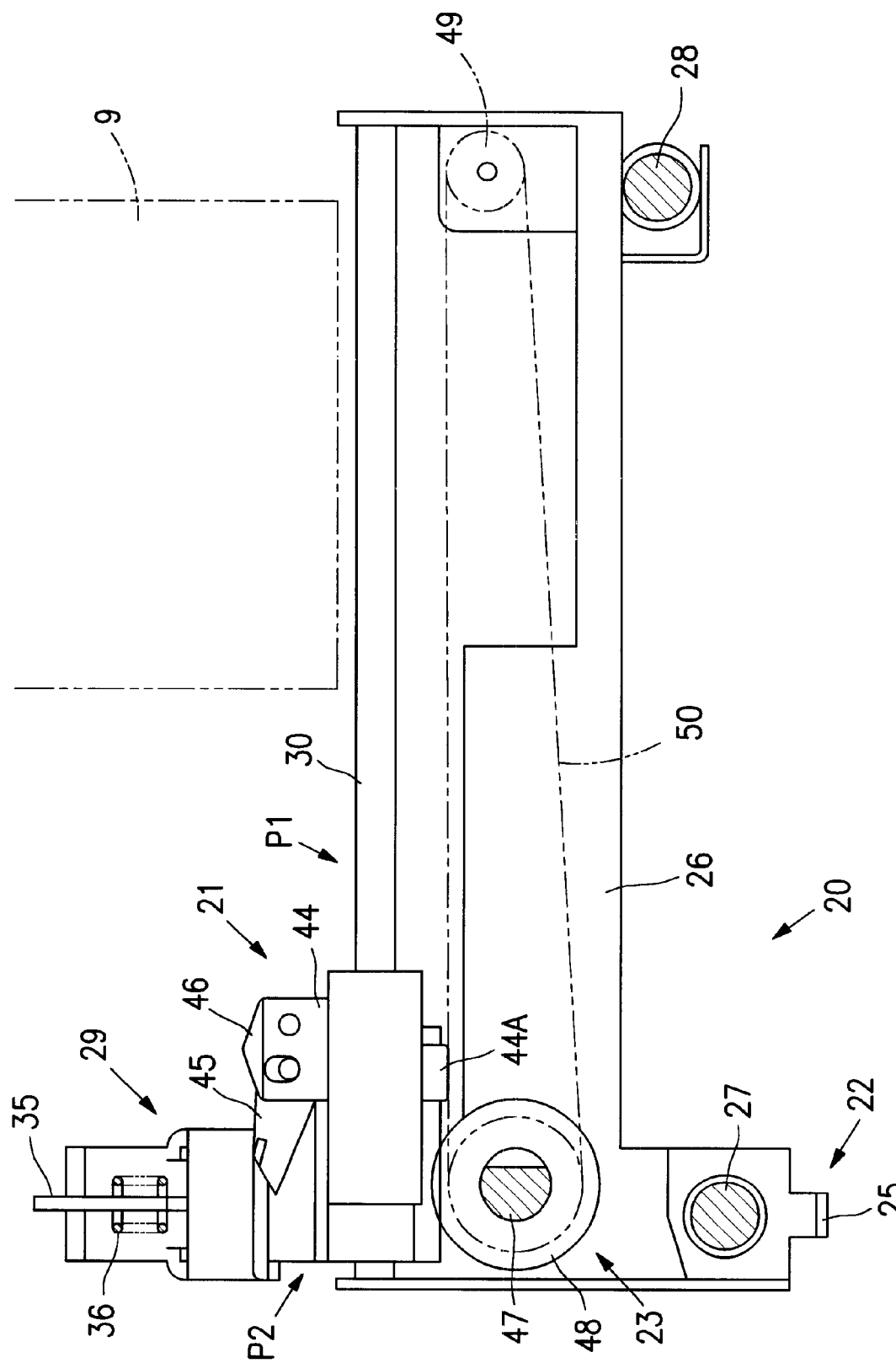
FIG. 10 is a front view showing the card extractor and the card holder of the card issuing device.

The card extracting and moving mechanism 2 shown in FIG. 2 is movably provided between the card supply parts 8 of the card stackers 9, and extracts cards from the card supply part 8 of any of the card stacker. As shown in FIG. 10, the card extracting and moving mechanism 2 has a card extractor 21 for extracting one card from a card stacker 9, a card holding mechanism 20 for holding the extracted card, and an X-axis moving mechanism 22 and a Y-axis moving mechanism 23 for moving the card holding mechanism 20 and the card extractor 21 in the X and Y directions.

Figure 9:
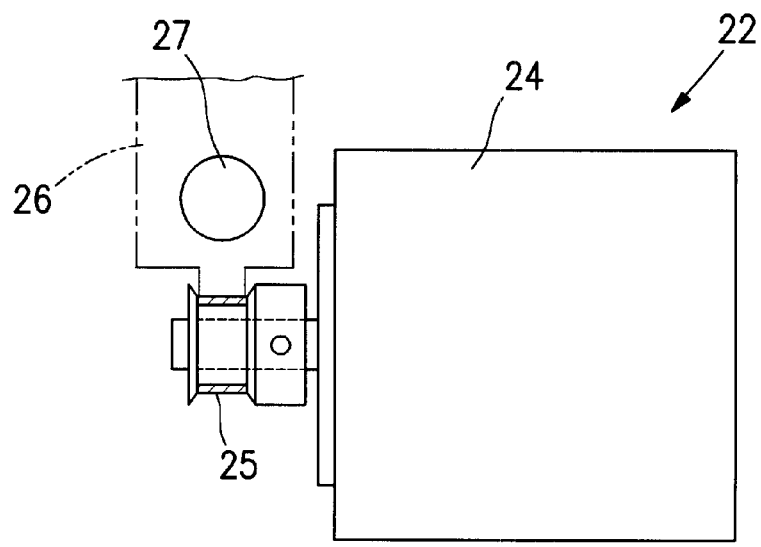
FIG. 9 shows the X-axis moving mechanism of the card issuing device.

The X-axis moving mechanism 22 is for moving in the longitudinal direction when the card holding mechanism 20 and the card extractor 21 are at a position spaced apart in the Y direction from the card stackers 9. As shown in FIGS. 9 and 10, the rotation of an X-axis drive motor 24 is transmitted to an X-axis drive belt 25 and moves a carriage 26 for supporting the card holding mechanism 20 along two X direction guide shafts 27 and 28.

Figure 11:
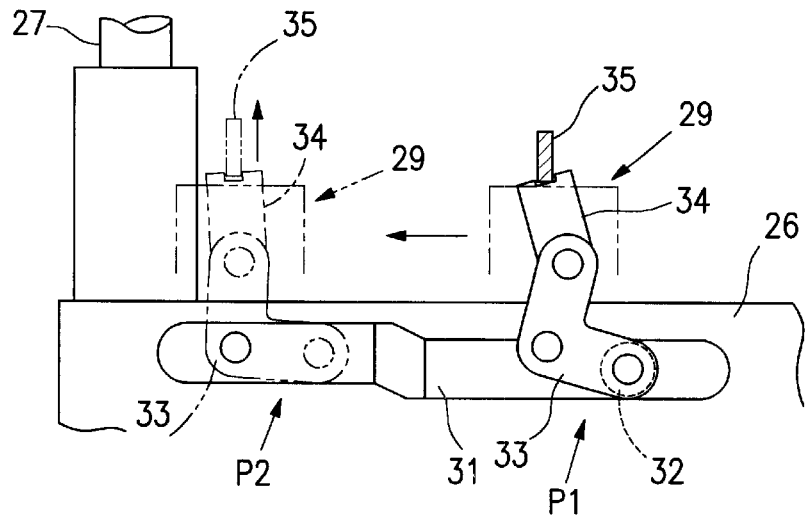
FIG. 11 is a top view showing the cam groove formed on the carriage in the card holder.

The card holding mechanism 20 moves between the card stackers 9. As shown in FIG. 10, the card holding mechanism 20 includes the carriage 26 which moves along two X direction guide shafts 27 and 28, and a card holder 29. As shown in FIG. 11, the card holder 29 is capable of moving between a temporary holding position P1 for holding a card temporarily, and a strong pressure position P2 that reliably holds the card with a pressure. The card holder 29 is set to the strong pressure position P2 when being moved in the X direction by the X-axis moving mechanism 22. Namely, the strong pressure position P2 is a position at which the card holder 29 and the card extractor 21 are separated from the card stacker 9. When the card holder 29 moves to this strong pressure position P2, the card is transferred by operating the X-axis moving mechanism 22.

Figure 12:
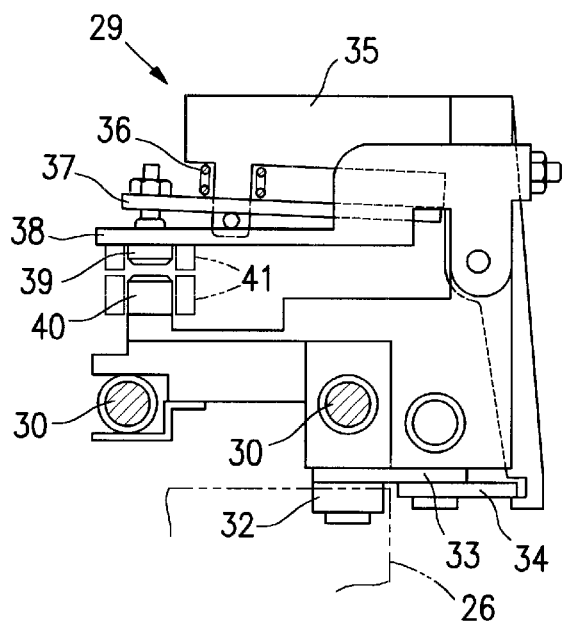
FIG. 12 is a side view showing the card holding member of the card holder.

Two Y direction guide shafts 30 of the Y-axis moving mechanism 23 are attached to the carriage 26 as shown in FIG. 12. When extracting a card from the card stacker 9, the card holder 29 moves from the temporary holding position P1 to the strong pressure position P2 as guided by two Y direction guide shafts 30. After extracting the card, the card holder 29 moves the card while in the strong pressure position P2. A cam groove 31 for changing the card holding state of the card holder 29 is formed on the top face of the carriage 26 as shown in FIG. 11. Namely, when the card holder 29 moves in the card extracting direction (to the left in FIG. 11) along the two Y direction guide shafts 30 from the temporary holding position P1 to the strong pressure position P2, an L-shaped lever 33 attached to a roller 32 which moves within the cam groove 31 rotates in the counterclockwise direction. This causes an operating lever 34 to move in the clockwise direction to press the bottom end of a card pressure lever 35. The card pressure lever 35 is rotated in the counterclockwise direction as shown in FIG. 12, and the extreme end thereof presses a middle lever 37 via a coil spring 36, which in turn presses a card holding lever 38. Thus, when the card holder 29 moves from the temporary holding position P1 to the strong pressure position P2, the L-shaped lever 33 rotates so that the extreme end is positioned approximately in a straight line in relation to the operating lever 34 so the operating lever pushes out the bottom end of the card pressure lever 35. In accordance with this, the extreme end of the card pressure lever 35 pushes down the middle lever 37 via the coil spring 36, presses a top card holding block 39 attached to the extreme end of the card holding lever 38 to a bottom card holding block 40, and the card is held in a strongly pressed state. In this state, the extreme end of the L-shaped lever 33 and the operating lever 34 are in a toggle clamp state due to being positioned approximately in a straight line. The gap between the card holding blocks 39 and 40 does not widen even if an external force is applied in the direction tending to separate the top and bottom card holding blocks 39 and 40. The card can therefore be firmly held between the card holding blocks 39 and 40.

On the other hand, when the card holder 29 returns from the strong pressure position P2 to the temporary holding position P1, the L-shaped lever 33 draws in the operating lever 34, and the force with which the operating lever 34 pushes out the bottom end of the card pressure lever 35 is cancelled. Therefore, the force of pressuring the top card holding block 39 to the bottom card holding block 40 is cancelled. In this state, the card is not held firmly between the card holding blocks 39 and 40. Instead, the card is held with a relatively weak force from plate springs 41 provided on both sides of the card holding blocks 39 and 40. Namely, at the temporary holding position P1 prior to the moving of the card holder 29 to the strong pressure position P2 by moving in the card extracting direction along the guide shaft 30, the card can be temporary held by the force of the plate springs 41.

Figure 13:
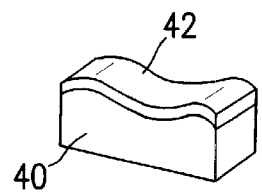
FIG. 13 is a perspective view showing the bottom card holding block of the card holder.

As shown in FIG. 13, a rubber plate 42 for preventing sliding of the card and protecting the card is adhered on the surface of the card holding blocks 39 and 40 (only bottom card holding block 40 is shown in FIG. 13). In addition, the area at the two end surfaces of the card holding blocks 39 and 40 is expanded and structured to hold the card at two points.

The card extractor 21 shown in FIG. 10 is a card delivery mechanism for extracting the card from the card supply part 8 formed on each card stacker 9. The card delivery mechanism, along with the card stacker part 1, form a card delivery device.

Figure 15:
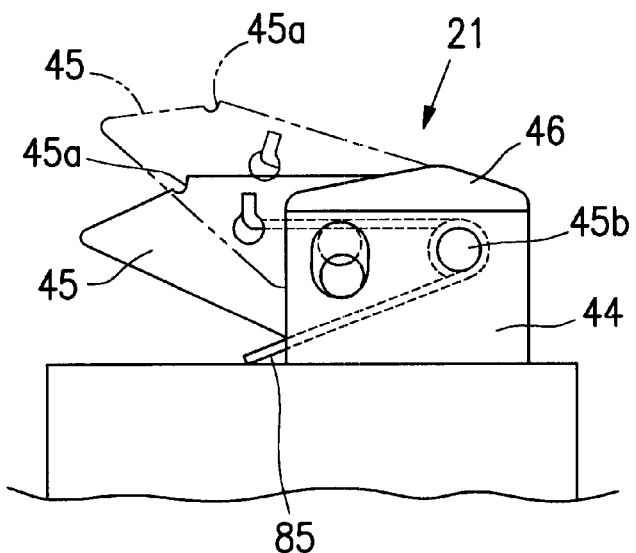
FIG. 15 is an enlarged front view showing the card extractor of the card issuing device.

The card extractor 21 has a movable body 44 which can be moved back and forth by a Y-axis drive motor 43 (FIG. 3), and a card engaging claw 45 which engages the rear face of the card. The movable body 44 is arranged on the card stacker 9 side of the card holder 29 and is moved in the Y direction the same way as the card holder 29, i.e., by being guided by the two Y direction guide shafts 30. The card holder 29 cannot pass below the card stacker 9 as shown in FIG. 14, but the movable body 44 can pass below the card stacker 9 in the Y direction and can move to the rear of the card stacker. The card engaging claw 45 is supported rotatably in the vertical direction with respect to the movable body 44 about a rotating shaft 45b, and is activated by a spring 85 in the direction which engages the card, namely, in the direction where the extreme end rotates upwards as shown in FIG. 15. Therefore, the card engaging claw 45 is pressed to the bottom face of the card positioned at the bottom of the card stacker 9, and a claw 45a of the card engaging claw 45 is lowered when passing below the card stacker. When extracting a card from the position of the movable body 44 indicated in FIG. 14, the card engaging claw 45 is lifted and engages the claw 45a with the rear edge of the card. At this time, the card is received by the convex part 12 positioned at the right side and the convex part 11 positioned at the left side of the card stacker 9 in FIG. 14. The card receiver 16 receives the card with two locations on the front and rear ends of the card, so even if the card is curved, the claw 45a can still engage the rear edge of the card and the card can be delivered.

The card engaging claw 45 is provided at two locations on the movable body 44 with a specified space in between as indicated by lines L2 in FIG. 8. Two card engaging claws 45 are arranged in the longitudinal direction, i.e., parallel to the X direction guide shafts 27 and 28.

The movable body 44 has a card support 46 which contacts the bottom face of the card and which remains in the card stacker 9 as shown in the figure when extracting the card. The card support 46 prevents the second card from the bottom of the card stacker 9 from striking the card engaging claw 45, which may cause the card engaging claw to be pushed down and result in defective delivery. By providing the card support 46, it is possible to prevent the claw 45a from An. separating from the card that is being delivered.

Figure 3:
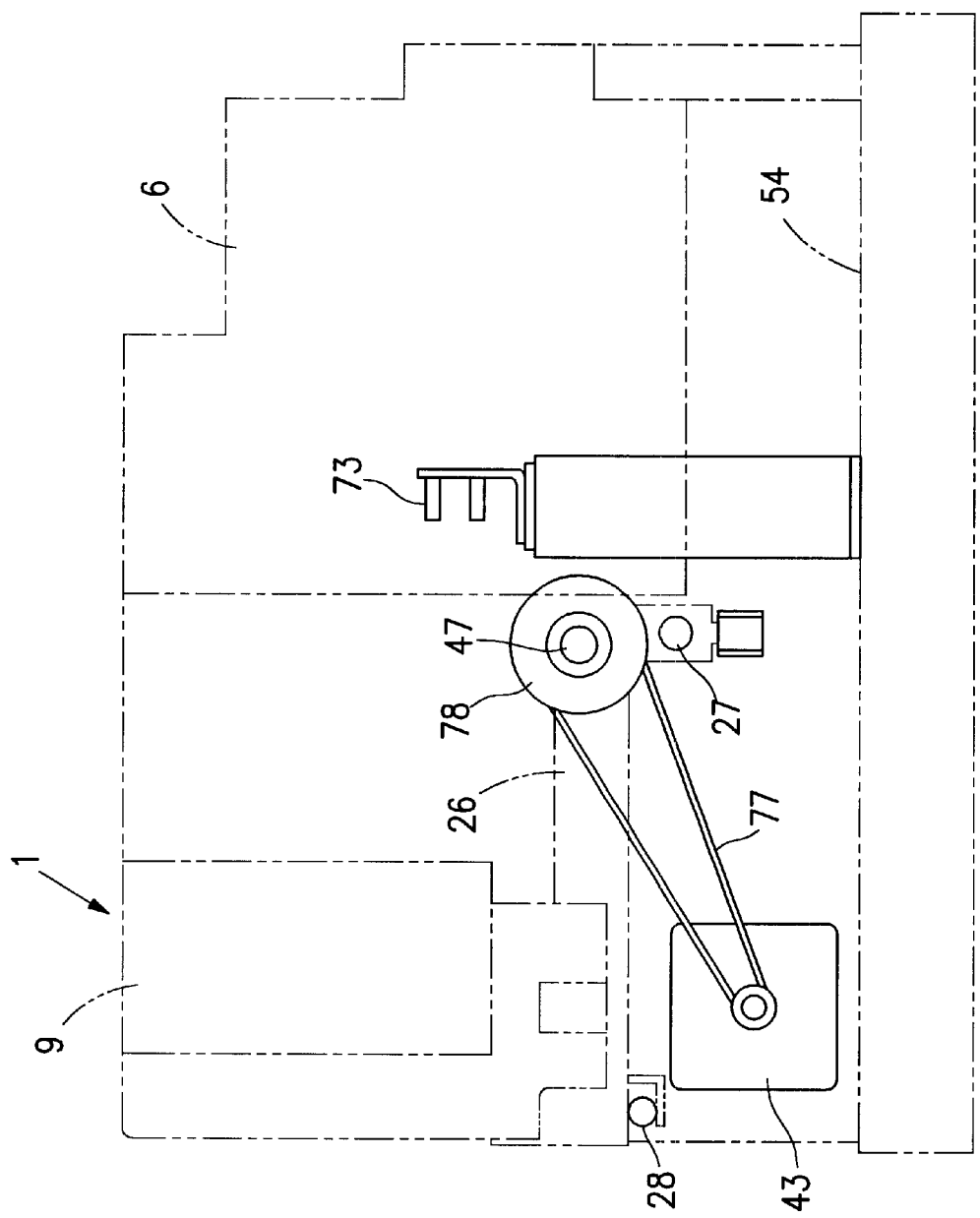

The Y-axis moving mechanism 23 shown in FIG. 10 is for moving the card extractor 21 to extract a card from the card supply part 8. The two Y direction guide shafts 30 are attached to the carriage 26, which can be moved in the X direction by the X-axis moving mechanism 22. The force of the Y-axis drive motor 43 which drives the Y-axis moving mechanism 23 is transmitted to the pulley 78 attached to the end on the topper mechanism 6 side of the Y drive shaft 47 via the belt 77 as shown in FIG. 3. The rotation of the pulley 78 is transmitted to a Y drive shaft 47 with a D-shaped cross section to rotate in unison, and the rotation of the Y drive shaft is transmitted to a Y drive belt 50 hung between the Y drive timing pulley 48 and Y driving pulley 49. The movable body 44 is coupled to the Y drive belt 50 by a coupling part 44A. Therefore, when Y drive belt 50 rotates, the movable body 44 moves along the Y direction guide shaft 30. At this time, the card holder 29 is pulled between the movable body 44 by a spring not shown in the figures. Consequently, when the movable body 44 moves towards the card stacker 9 from the position indicated in FIG. 10 by rotation of the Y drive belt 50, the card holder 29 moves in unison with the movable body 44 and moves towards the temporary holding position P1 from the strong pressure position P2 (although the card is not being held). However, the card holder 29 cannot pass through the card stacker 9, so only the movable body 44 passes under the bottom of the card stacker. When the movable body 44 is passing under the bottom of the card stacker 9, the card holder 29 is pressed to the side wall 9a of the card stacker as shown in FIG. 14.

While extracting a card, the Y drive belt 50 rotates in the direction opposite the aforementioned case from the position shown in FIG. 14. Then the movable body 44 moves to the card holder 29 side while extracting a card from the position shown in FIG. 14. The extracted card enters between the card holding blocks 39 and 40 of the card holder 29 shown in FIG. 12, and moves by being held between them with a weak force from plate springs 41 at the top and bottom. The extracted card comes between the card holding blocks 39 and 40 and slides with respect to the plate springs 41 until the movable body 44 strikes the card holder 29, and then they move in unison. Then, when the movable body strikes the card holder 29 by passing below the card stacker 9, the movable body presses the card holder 29 and moves in unison with it. Then, the roller 32 at the temporary holding position P1 moves along the cam groove 31 formed on the carriage 26 along with the movement of the card holder 29. When the roller 32 moves to the strong pressure position P2, it holds the card firmly with the card holding blocks 39 and 40.

Figure 4:
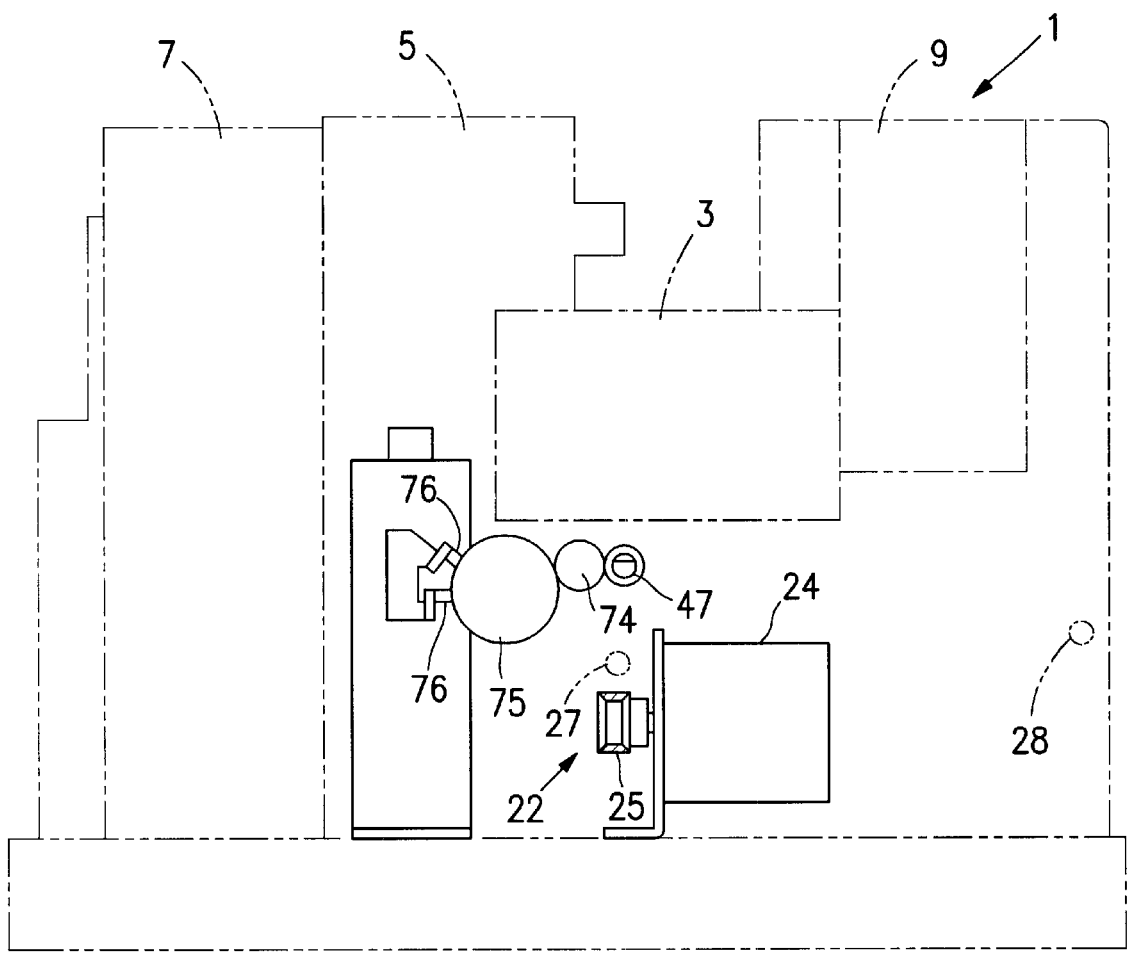

The amount of motion of the movable body 44 is determined by the rotation of the Y drive shaft 47 as shown in FIG. 4. With regard to the rotating amount of Y drive shaft 47, the position of the movable body 44 with respect to the carriage 26, namely, the positions of the card holder 29 and the card extractor 21 and the return position of the card extractor, can be detected by transmitting the rotation of the Y drive shaft 47 to the pulley 75 via the pulley 74 and detecting the angle of rotation of the pulley 75 with a sensor 76.

The Y drive shaft 47 has a D-shaped cross section and transmits the rotating force by fitting into the D-shaped hole of Y drive timing pulley 48. Consequently, the carriage 26 can transmit the rotating force while moving in the X direction. Alternatively, the same function can be performed by a spline shaft or a pin and groove double D cross-section shaft.

The card reader 3 shown in FIGS. 1 and 2 receives a card from the card extracting and moving mechanism 2, and issues a card from the card issuing port 51 after specified information is recorded on the card. The card reader 3 is provided with a card transporter and a recording and reproducing part 52A for carrying out data recording and reproduction to or from the card in a known fashion. The card transporter is formed in the same direction as the X-axis and transports the card on the movement line towards the X direction by the X-axis moving mechanism 22. The card transporter has, for example, three pairs of rollers 52. The recording and reproducing part 52A carries out data recording or reproduction to or from the card, and may have a magnetic head for recording on a magnetic strip of the card, and/or an IC contact point block which records by contacting the IC contact point of the card.

When moving the card delivered by the card stacker 9 between the topper mechanism 6 and the engraving/embossing mechanism 5 by the X-axis moving mechanism 22, the card holder 29 has been moved to the strong pressure position P2 and the card can be held firmly between the card holding blocks 39 and 40. However, when delivering the card to the card reader, the card reader is connected to the card extracting and moving mechanism 2 at the position corresponding to the temporary holding position P1 of the card holder 29, so the card is temporarily lightly held by the plate springs 41 on both sides of the card holding blocks 39 and 40. Thus when the leading edge of the card is inserted between the rollers 52, the card can be drawn into the card reader 3.

Figure 16:
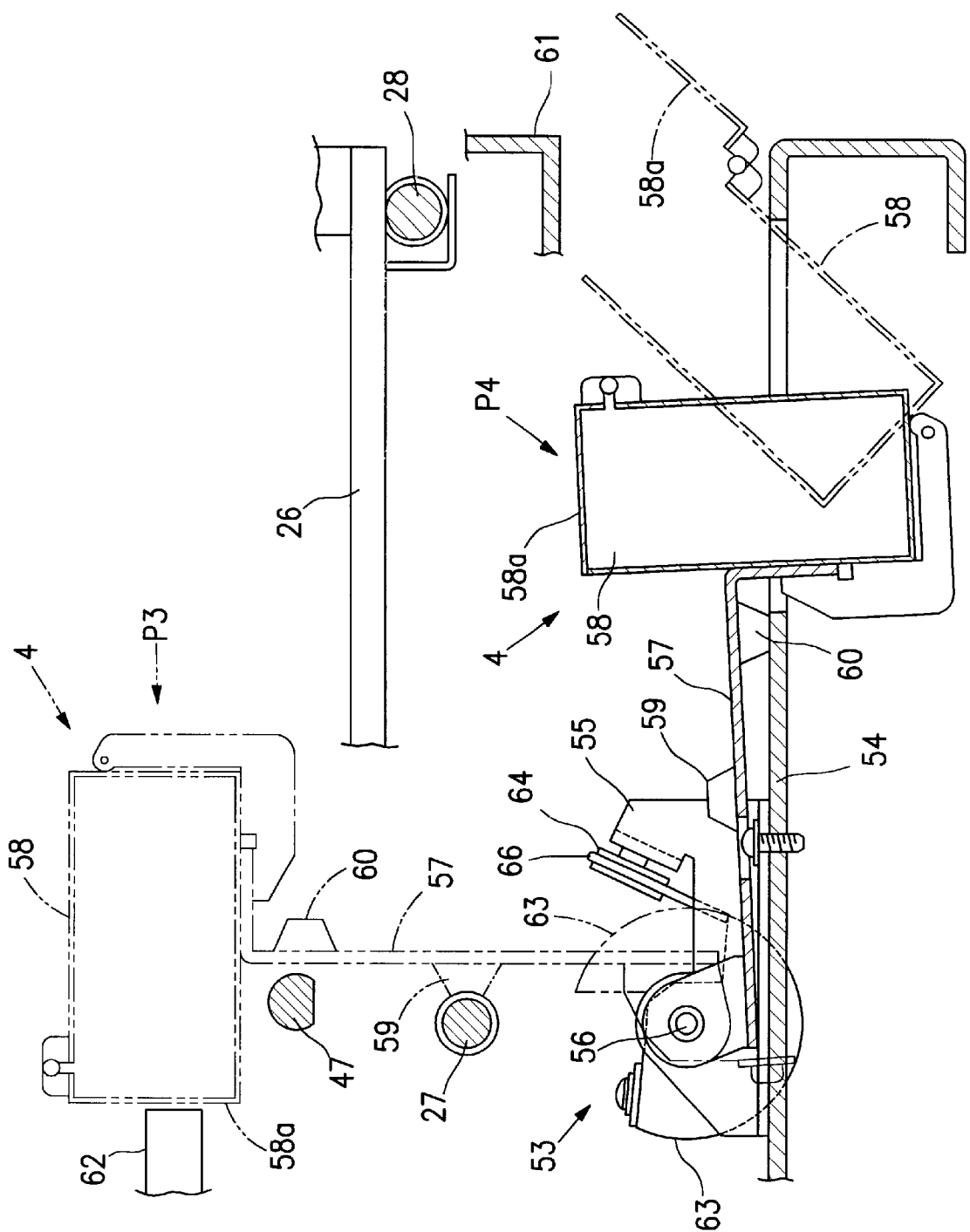
FIG. 16 is a side view showing the waste card receiver of the card issuing device.
Figure 17:
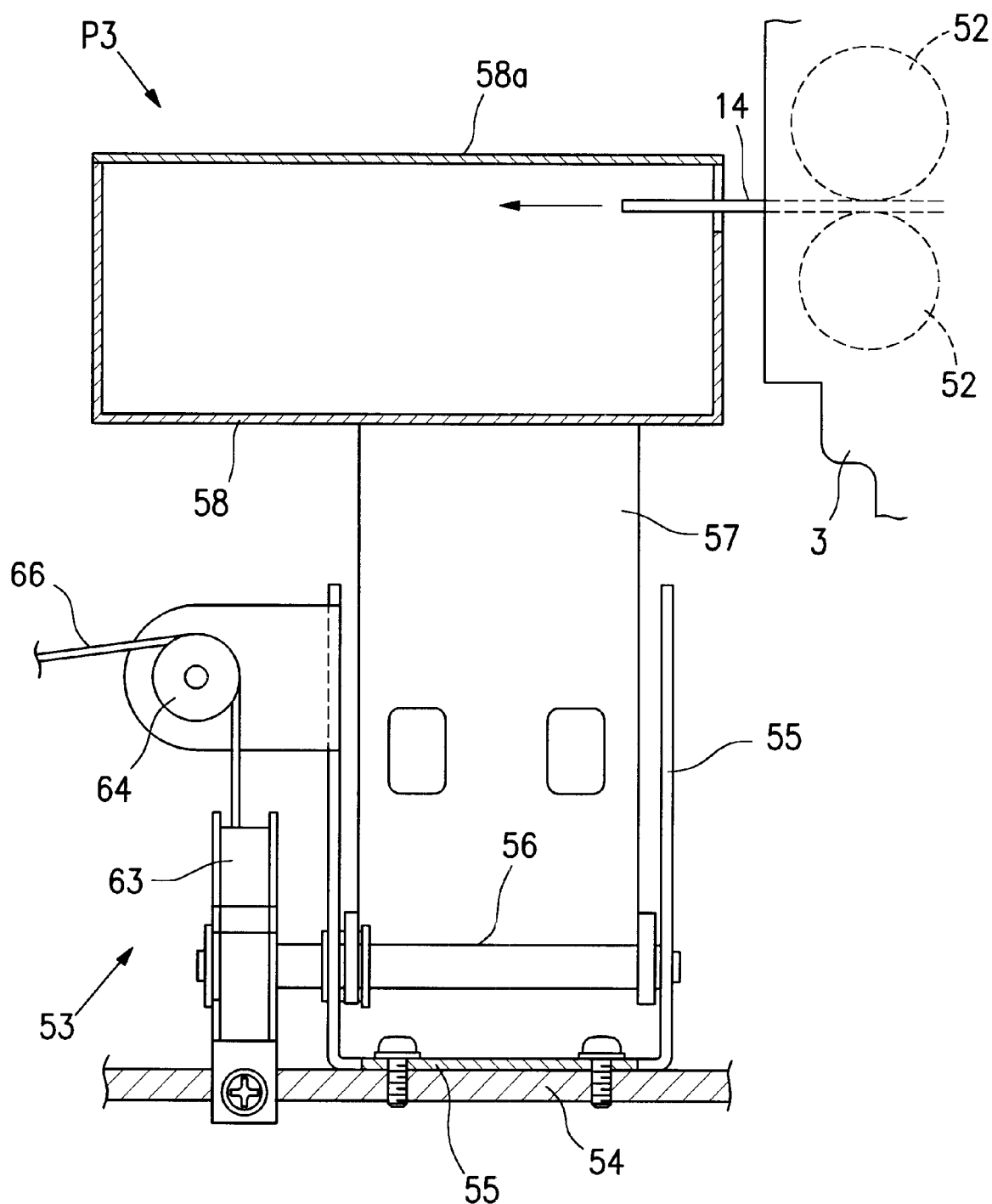
FIG. 17 is a front view showing the waste card receiver where the waste card box has been moved to the receiving position.

The waste card receiver 4 shown in FIG. 1 is able to move between a receiving position P3 shown in FIGS. 16 and 17 for receiving unwanted cards from the card reader 3, and a withdrawal position P4 (FIG. 16) where it is retreated from the moving locus of the carriage 26, as shown in FIGS. 16 and 17, so as not to interfere with the movement of the carriage 26. The waste card receiver 4 is moved between the receiving position P3 and the withdrawal position P4 by a waste card receiver moving mechanism 53.

The waste card receiver 4 is provided with a bracket 55 fixed to a frame 54 of the card issuing device, an arm 57 rotatably supported on the bracket 55 via a support shaft 56, and a waste card box 58 fixed to the extreme end of the arm 57. The arm 57 is fixed to the support shaft 56, and the waste card box 58 moves between the receiving position P3 and the withdrawal position P4 by the support shaft 56 and the arm 57 rotating via the bracket 55. At the receiving position P3, a rubber stopper 59 strikes the X direction guide shaft 27 and is suitably positioned. At the withdrawal position P4, a rubber stopper 60 strikes a frame 54 of the card issuing device and is suitably positioned.

The withdrawal position P4 is arranged near a waste card extraction port 61 formed on the frame of the card issuing device. At the withdrawal position P4, it is possible to extract waste cards in the waste card box 58 by opening a cover 58a while turning over the waste card box as shown in FIG. 16. Also, at the withdrawal position P4, the presence or absence of cards in the waste card box 58 can be detected by a sensor not shown in the figures. When the waste card box 58 is at the receiving position P3, a cover stopper 62 is positioned near the cover 58a to prevent the cover from being accidentally opened.

The waste card receiver moving mechanism 53 is driven by the card extracting and moving mechanism 2 and is provided with a pulley 63 attached to one end of the support shaft 56, a wire pulley 64 attached to the bracket 55, and a wire 66 for transmitting the drive force of the X-axis moving mechanism 22 to the pulley 63 when a selective driving means 65 (to be discussed later) is driven.

Figure 18:
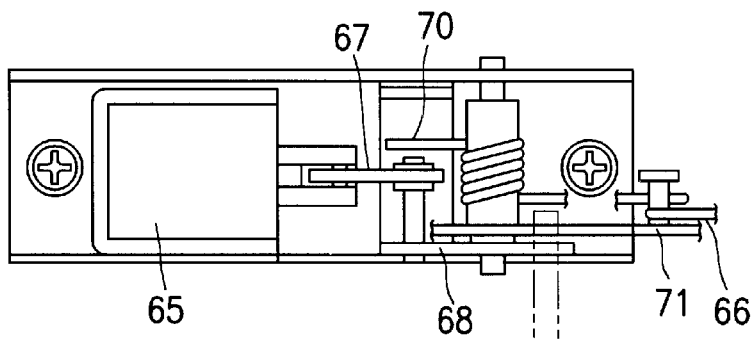
FIGS. 18 and 19 are top and side views, respectively, of the selective driving means of the card issuing device.
Figure 19:
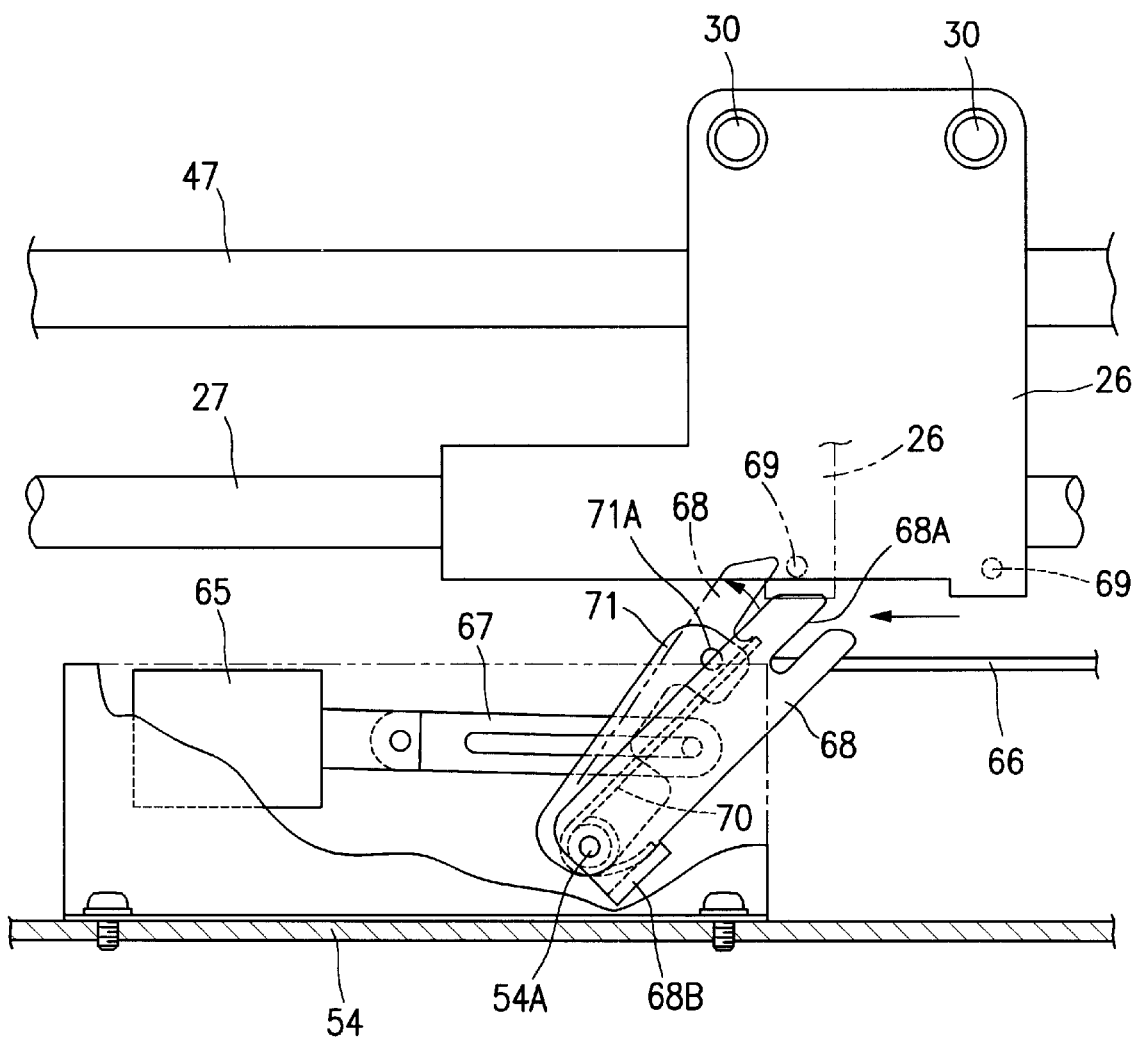

The selective driving means 65 is, for example, a solenoid as shown in FIGS. 18 and 19. When the solenoid 65 is pulled, a trigger link 67 is pulled and rotates a pin lever 68 rotatably supported on the support shaft 54A in the counterclockwise direction as shown in FIG. 19. The rotation stops at the position where an engaging groove part 68A provided at the extreme end of the pin lever 68 enters into the moving locus of a pin 69 attached to the carriage 26 of the X-axis moving mechanism 22 (FIG. 19). In this state, the pin lever 68 rotates, but this rotation only deforms a spring 70 engaged between a pin 71A provided on a wire lever 71 and an engaging part 68B of the pin lever 68, and does not move the waste card box 58 by moving the wire lever 71. Namely, the suctioning operation of the solenoid 65 need only be so that the engaging groove part 68A of the pin lever 68 is positioned at the moving locus of the pin 69, so a very compact solenoid can be used.

Figure 20:
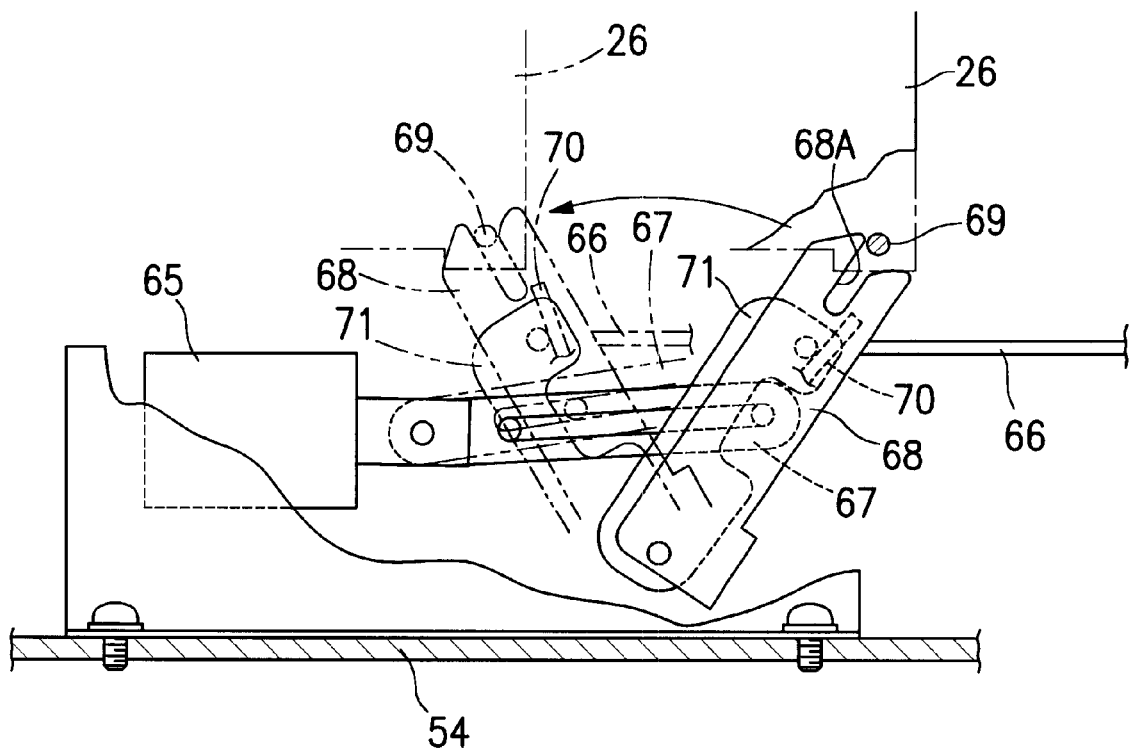
FIG. 20 illustrates the operation of the selective driving means.

When the carriage 26 is moved by the X-axis moving mechanism 22 by being driven with the extreme end of the pin lever 68 having entered into the moving locus of the pin 69, the pin engages with the extreme end of the pin lever as shown in FIG. 20 and the pin lever rotates about the pin along with the movement of the carriage 26. The wire lever 71 is rotated via the spring 70; therefore, the wire 66 is pulled, and, as shown in FIG. 16, the arm 57 is raised and moves the waste card box 58 to the receiving position P3. By moving the X-axis moving mechanism 22 in a specified direction along with driving the selective driving means (solenoid) 65, it is possible for the waste card receiver moving mechanism 53 to move the waste card receiver 4 from the withdrawal position P4 to the receiving position P3 with the X-axis moving mechanism 22. The waste card receiver 4 is thus driven by the X-axis drive motor 24 of the X-axis moving mechanism 22, and a separate and dedicated motor is not necessary for driving the waste card receiver 4.

The spring 70 is provided between the wire lever 71 coupled with the wire 66 and the pin lever 68 which is moved by the pin 69, so it is possible to prevent slacking of the wire by deformation of the spring 70 even if the wire is unintentionally pulled. Therefore, it is possible to prevent the wire 66 from slipping out from the wire pulley 64.

The engraving/embossing mechanism 5 and the topper mechanism 6 shown in FIG. 1 are provided at the opposite side of the X-axis moving mechanism 22 from the card stackers 9. The engraving/embossing mechanism 5 is, for example, a known embossing device for marking specified characters (including codes and symbols, etc.) on the card. The topper mechanism 6 may be a known topper device for applying colors to the marked characters. The topper mechanism 6 is moveable towards and away from the X-axis moving mechanism 22. Namely, the guide rails 72 which are orthogonal and in the same plane as the two X direction guide shafts 27 and 28 are attached to the frame 54 of the card issuing device, and the topper mechanism 6 is made movable along the guide rails 72. In accordance with this, a working space can be created if the topper mechanism is separated from the X-axis moving mechanism 22 during maintenance or when changing the topping wheel on the topper mechanism.

Numeral 73 in FIG. 1 denotes a sensor for detecting the edge of a card, and is attached to the frame 54 of the card issuing device as shown in FIG. 3. The sensor 73 detects whether or not the card is held by the card holder 29 at an angle with respect to the X direction guide shafts 27 and 28. By measuring the amount of motion of the carriage 26 in the X direction and the amount of motion of the card holder 29 in the Y direction during the time period between the detection of two positions on an edge of the card, it is possible to detect whether or not the card is slanted and the amount of the slant. The line L1 in FIG. 2 indicates the movable range of the card.

In the card issuing device, the X- and Y-axis drive motors 24 and 43, the solenoid 65 of the waste card receiver 4, the engraving/embossing mechanism 5, and the topper mechanism 6 are controlled by the control part 7. One card is extracted by the card extracting and moving mechanism 2 from one of the plurality of card stackers 9, and the card is issued from the card issuing port 51 after specified recording is done by the card reader 3. When receiving an unwanted card from the card reader 3, the waste card receiver 4 is moved to the receiving position P3 from the withdrawal position P4 by the card extracting and moving mechanism 2.

In operation, to extract a card from the card supply part of a card stacker, the card extractor is moved by operating the Y-axis moving mechanism after operating the X-axis moving mechanism, and the card holding mechanism and the card extractor are moved to a position opposite the card stacker. When the operation of the Y-axis moving mechanism is continued, the extracted card reaches a position where it can be processed by the engraving/embossing mechanism and the topper mechanism. Here, characters are formed at the specified positions of the card-while the card is moved by the X-axis moving mechanism. After forming the characters, the X- and Y-axis moving mechanisms are operated and the card is transported to the card reader. After completing the transport, the X-axis moving mechanism moves the card holding mechanism and the card extractor to a position opposite the card stacker from which the next card is to be extracted, and the above operations are repeated.

More specifically, the control part 7 operates the X-axis drive motor 24 (FIG. 4) and moves the carriage 26 to the front of the specified card stacker 9 via the X-axis drive belt 25. Namely, the card holding mechanism moves to the position of the selected card stacker. In this position, the card extractor is at a position opposite the card supply part, and the card extractor can extract a card from the card stacker. Thereafter, the Y-axis drive motor 43 shown in FIG. 3 is operated, the card holder 29 and the card extractor 21 are moved, and the bottom card stored in the selected card stacker 9 is extracted with the card engaging claw 45 of the card extractor 21. Thereafter, when the card holder 29 is moved to the strong pressure position P2, the extracted card is held firmly by the card holder.

Next, the control part 7 moves the card by controlling the X- and Y-axis drive motors 24 and 43, and the held position of the card is recognized by the sensor 73 having an optical sensor. In order to recognize the held position of the card with one sensor 73, the Y-direction displacement of the longitudinal edge position of the card at two positions spaced apart in the longitudinal direction is detected. The detection is carried out by measuring the position where the edge of the card intercepts the sensor 73 by moving the card in the Y direction.

The card is moved in the Y direction from the original position set beforehand as shown in FIG. 1, and the position of the longitudinal edge 14Y at a position along the edge near the card reader 3 is measured and the value stored as α. Then, the card is returned temporarily to the position cc, and moved toward the card reader 3 by an amount β in the X direction. The card is moved in the Y direction again, and the position of the longitudinal edge 1 4Y at a position far from the card reader 3 is measured and the value stored as γ. If the longitudinal edge 14Y of card is parallel to the X-axis, then α=γ. If it is slanted, then α≠γ. The control part 7 calculates the slanting of the card from this difference as well as the value of P3.

Next, the control part 7 moves the carriage 26 to the front of the engraving/embossing mechanism 5 by operating the X-axis drive motor 24, and characters are marked at specified positions of the card by the engraving/embossing mechanism 5. When marking a plurality of characters, the card is moved in a stepwise manner in the X direction, the size of each step being equal to the spacing between adjacent characters to be marked on the card. In this case, when the held position of the card is detected as being slanted, the control part 7 operates the Y-axis drive motor 43 to move the card in the Y direction for each step of the X-movement. The size of the Y-movements are calculated from the measured slanting angle. As a result, the effect of card slanting is corrected, so that the characters form a row parallel to the card edge. When the marking of characters is finished, the control part 7 moves the carriage 26 to the front of the topper mechanism 6 by operating the X-axis drive motor 24 as needed to color the marked characters.

As described above, the engraving/embossing mechanism and the topper mechanism are arranged on the opposite side of the card extracting and moving mechanism from the card stacker part, so the card extracted from the card stacker can be transported to the engraving/embossing mechanism and the topper mechanism by moving the X-axis moving mechanism and the Y-axis moving mechanism. In addition, the card supply parts of the card stacker are arranged in a line on the same plane, so the cards can be extracted from any card stacker by moving the card extracting and moving mechanism linearly.

A card marking method and a card issuing method according to embodiments of the present invention is now explained.

As described above, the card is moved with respect to the sensor 73 by the X and Y drive mechanisms 22 and 23. The inclination of the card held in the card holder 29 is detected by detecting the positions of two points on a longitudinal edge of the card and one point on an edge orthogonal to the longitudinal edge. The marking position is corrected by the X and Y drive mechanisms 22 and 23 for each mark to be made by the engraving/embossing mechanism 5, and the marking direction is corrected to a specified direction. The sensor 73 in this embodiment is provided to detect whether or not the card is slanted, but an optical sensor can be used to detect the presence or absence of a card. A detecting device other than an optical sensor can also be used.

Figure 30:
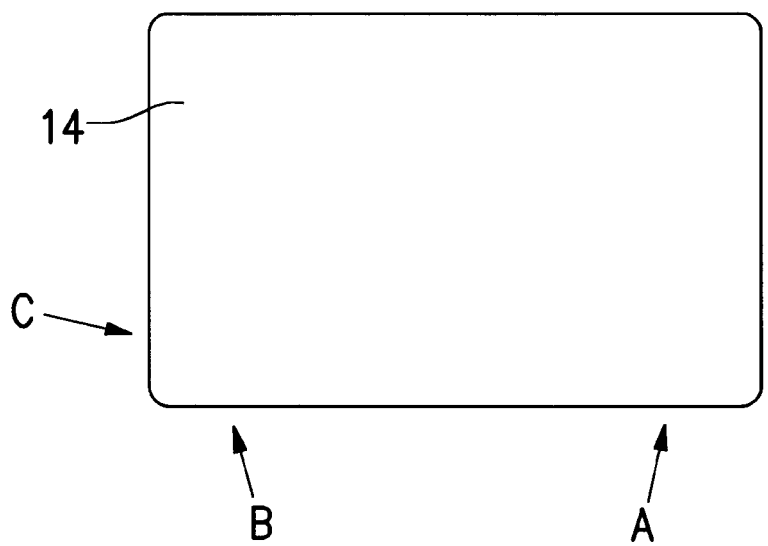
FIG. 30 shows an example of setting three points of virtual origins A, B, and C on the card in a card marking method according to an embodiment of the present invention.

In order to measure the inclination of the card, three points of virtual origins A, B, and C are set on the card as shown in FIG. 30. These points are provided virtually to the edge of the card. Points A and B are located at the front and rear portions on an edge along the longer dimension (e.g., bottom edge) of the card, and point C is located on an edge along the shorter dimension near point B. These virtual origins are set at the linear sections of the edges and not the round sections at the corners of the card. Precision in the inclination measurement can be improved by having A and B spaced apart from each other along a straight line.

Figure 31:
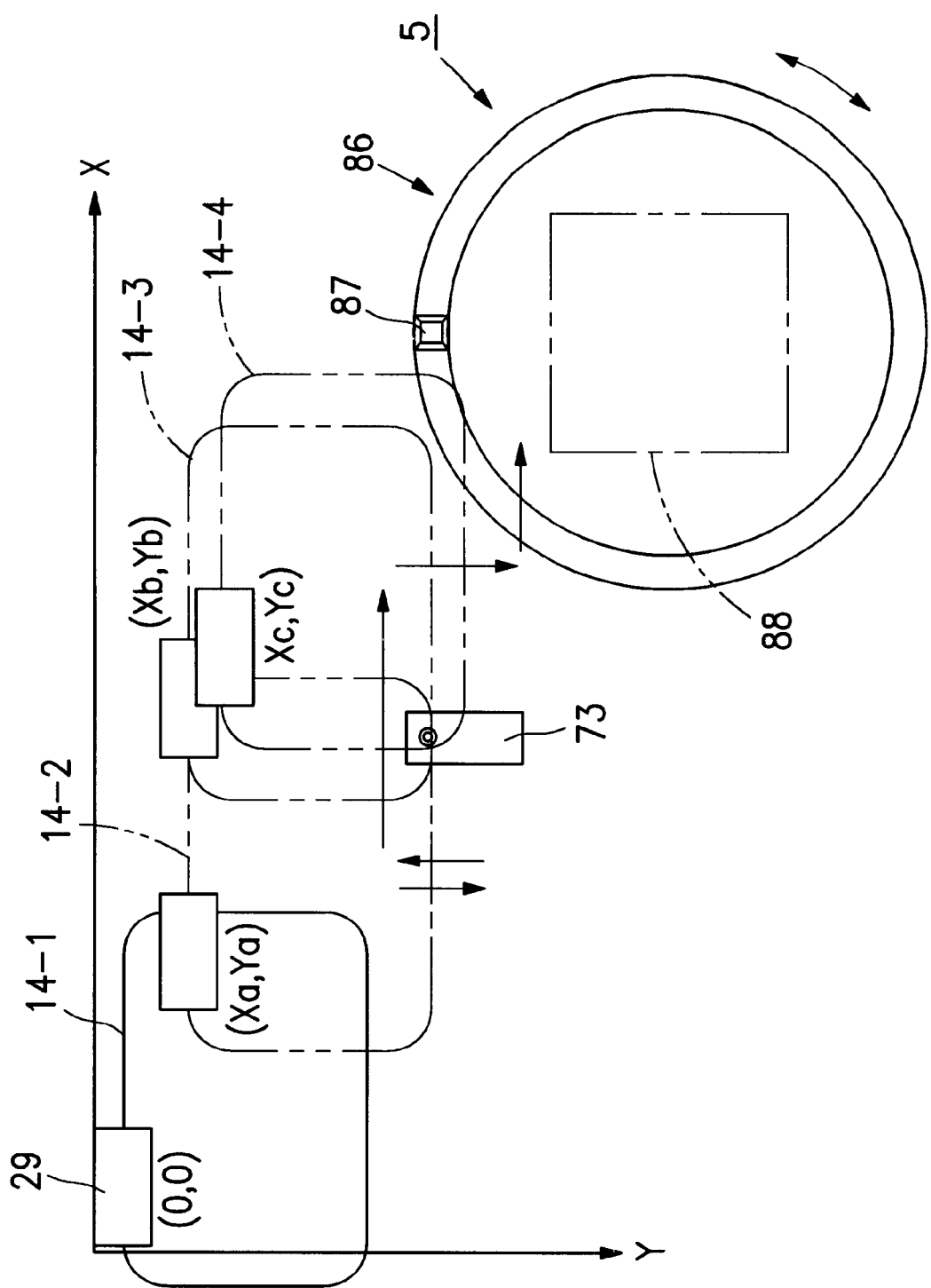
FIG. 31 is a top view showing the card marker and an example when the card is put through a series of operations in a card marking method according to an embodiment of the present invention.

As shown in FIG. 31, the card at an original position 14-1 is moved in the X direction while being held in the card holder 29, and the movement in the X direction is temporarily stopped at a position 14-2 near the sensor 73. Here, the card is moved in the Y direction, and X and Y coordinates (Xa, Ya) are detected when the edge of the card transverses the sensor 73 near the origin A. The coordinates can be measured with a given point on the card as a reference, or they can be measured with the position 14-1 as the origin and the corner part of the carriage 26 as the reference, as illustrated. After the initial coordinate is obtained and stored in the control part 7, the card is moved to the negative Y direction and returned to a state in which the card and the sensor 73 are not superimposed.

Next, the card is moved again in the X direction and the movement is stopped at a position 14-3 at which point B reaches the vicinity of the sensor 73. Then, the card is moved in the positive Y direction and coordinates (Xb, Yb) are detected when the card edge near point B traverses the sensor 73. Then, instead of returning to the negative Y direction, the card is moved in the X direction while blocking the sensor 73, and the coordinates (Xc, Yc) of a position 14-4 are detected where the edge near point C transverses the sensor 73. The coordinates (Xc, Yc) are utilized for positioning the card in the X direction.

The inclination of the card can be detected from the above coordinates. Namely, if the values of Ya and Yb are unequal, then the card is slanted. If the inclination angle with respect to the X direction is designated θ (clockwise rotation being positive), the magnitude θ is obtained from the ratio of (Ya–Yb) and (Xa–Xb).

Figure 32A:
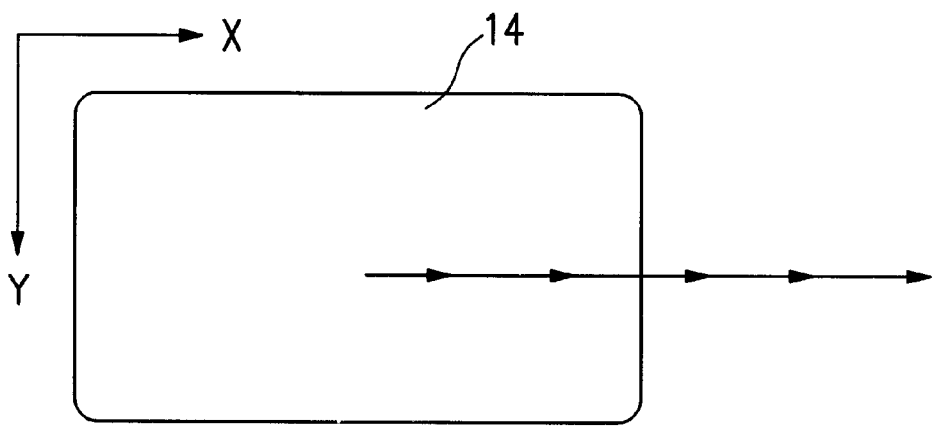
FIG. 32(A) illustrates a case when the card is not slanted with respect to the X direction.
Figure 32B:
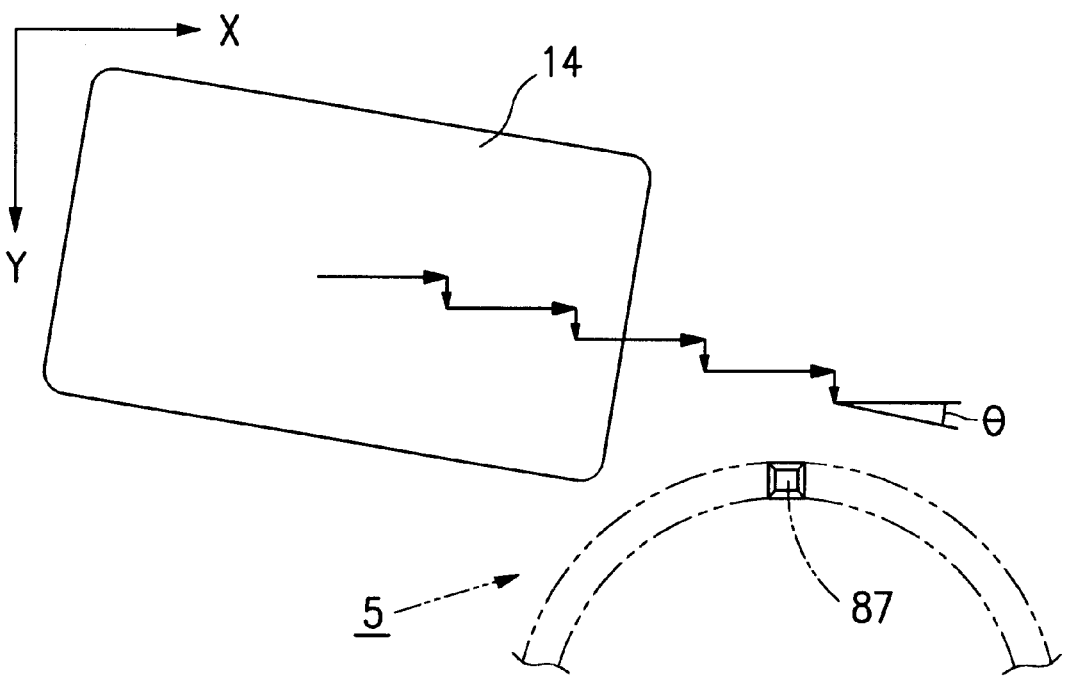
FIG. 32(B) illustrates a case when the card is slanted by an angle θ.

After the inclination angle θ is obtained, characters are marked continuously on the card in a specified direction by the engraving/embossing mechanism 5 while the effect of the inclination is corrected. For example, if a plurality of characters are marked continuously at equal intervals, the corresponding relationship of how much the card is stroked in the Y direction for each step it is stroked in the X direction can be calculated using inclination angle θ. The X-axis and Y-axis moving mechanisms 22 and 23 are operated and the card is moved by a specified amount in the Y direction as well as the X direction. For example, if the inclination angle θ is 0 as shown in FIG. 32(A), the card is delivered in the X direction and no Y direction movement is necessary. When the card is inclined by a non-zero angle θ as shown in FIG. 32(B), adjustment is made to place the characters parallel to the bottom edge of the card by stroking the card in both the X direction and the Y direction. Therefore, when the movement of the card is observed from the printing part 87 side of the engraving/embossing mechanism 5, the locus of the card runs diagonally in a stepwise manner as shown in the figure. The end points of each step-wise movement form a straight line that is inclined by an angle θ from the X direction.

Figure 33A:
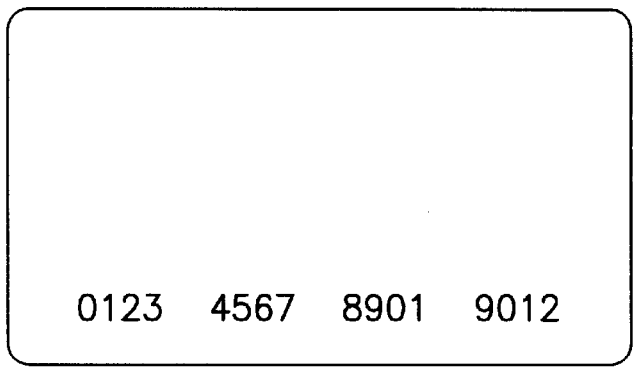
FIG. 33(A) shows marked characters when the card is marked normally.
Figure 33B:
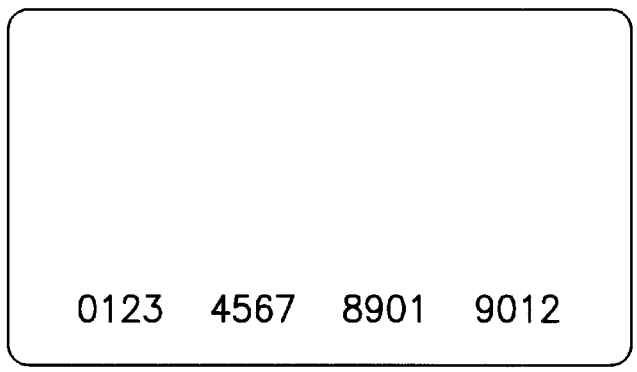
FIG. 33(B) shows marked characters when the card is marked in a slanted state.
Figure 33C:
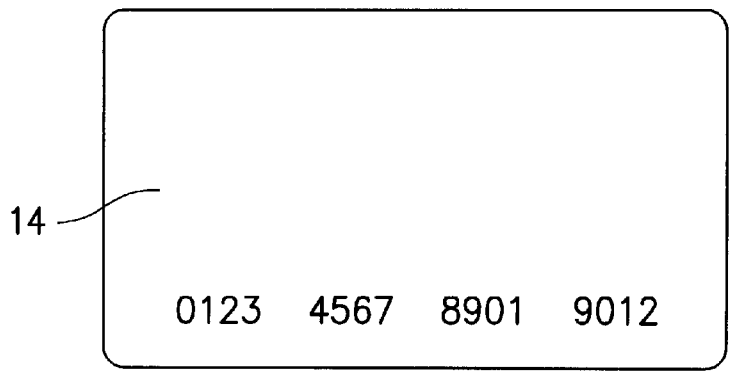
FIG. 33(C) shows marked characters when the card is marked using a method according to an embodiment of the present invention.

By performing the correction as described above, each character printed on the card is slanted by an angle as shown in FIG. 33(C), but the orientation of each character is the same and the characters are arranged in a row parallel to the bottom edge of the card.

The above-described correction method can be carried out using a single sensor, simplifying the structure of the device. Furthermore, the correction process is simple as it involves only a few new movements of the card in the Y direction. Further, the method can be applied to form two or more rows of characters.

When the marking of characters is finished, the control part 7 moves the carriage 26 towards the card reader 3 by operating the X-axis drive motor 24. The control part 7 then moves the card holder 29 to the temporary holding position P1 by operating the Y-axis drive motor 43, whereby the card enters a temporary holding state and is transferred to the card reader 3. At the card reader 3, the card is issued from the card issuing port 51 after specified recording is done with the recording part 53 under the control of the control part 7.

If the card is defective, the control part 7 moves the carriage 26 in the direction away from the card reader 3 by operating the X-axis drive motor 24 after operating the solenoid 65 of the waste card receiver 4. Accordingly, the pin lever 68 and the pin 69 of the carriage 26 engage, the wire 66 is pulled, and the waste card box 58 moves to the receiving position P3. After the pin lever 68 and the pin 69 engage, the control part 7 cancels the operation of the solenoid 65 in order to conserve power.

When the waste card box 58 moves to the receiving position P3, the control part 7 operates the card reader 3 and discharges the card in the card reader into the waste card box (FIG. 17). At the receiving position P3, the card in the card reader 3 is directly discharged into the waste card box 58 and stacked within the waste card box in the same posture since the waste card box is positioned directly in front of the card reader 3.

Next, the control part 7 moves the carriage 26 towards the card reader 3 by operating the X-axis drive motor 24, causing the pin lever 68 and the pin 69 of the carriage 26 to disengage and the waste card box 58 to move to the withdrawal position P4. Therefore, the waste card box does not obstruct the movement of the carriage 26 thereafter, nor does the waste card box 58 move to the receiving position P3 since the pin lever 68 withdraws from the moving locus of the pin 69 in this state. The above steps are repeated to process additional cards.

In the card issuing device described above, four card stackers 9 are provided and four types of cards can be handled by loading a different type of card in each card stacker. Alternatively, when the same type of cards are loaded in the card stackers, one type of card can be handled in a large volume.

Since the card engaging claw 45 which extracts the cards one at a time from the card stacker 9 is movable between the card stackers 9 by the X-axis moving mechanism 22, it is only necessary to provide one card engaging claw for a plurality of card stackers.

Since the card holder 29 and the card extractor 21 are moved on the same axis using the Y direction guide shaft 30, they can be moved together. The card engaging claw 45 can be driven in the X and Y directions using the same motors 24 and 45. In addition, the waste card box 58 is moved using the same motor 24. The card holding blocks 39 and 40 shown in FIG. 11 hold the card at a position that does not interfere with the movements of other parts during the engraving/embossing operation. All of the above design features contribute to making the device compact, simple and easy to manufacture.

The holding position of the card by the card holding blocks 39 and 40 is shown in FIG. 11. The blocks 39 and 40 hold the card at a position that does not interfere during engraving/embossing process, so the device is simplified.

Along with making the holding force of the card into two stages, strong and weak, and providing the temporary holding position P1 and the strong pressure position P2, two card engaging claws 45 are provided to extract the card so the degree of parallelism of the card with respect to the X-axis during card extraction can be maintained. In addition, holding displacement of the card is prevented during the engraving/embossing process while moving the card in the X direction.

Since the card is extracted by two card engaging claws 45, the degree of parallelism of the card can be adjusted by adjusting the card engaging claws, and the card can be extracted in a parallel attitude. Consequently, it is possible to reduce the possibility of the card becoming slanted with respect to the X direction, due to parts error, assembly error, etc. of the device. As shown in FIG. 8, the moving locus L2 of the two card engaging claws 45 are positioned on both sides of the card receiving block 13, so it is possible to prevent the card from being displaced towards the rotating direction by an external force acting on the card.

The extreme end of the L-shaped lever 33 and the operating lever 34 are positioned approximately on the same straight line at the strong pressure position P2 as shown in FIG. 11, so a toggle clamp can be used. Consequently, in addition to being able to hold the card firmly without applying a great force, a heavy load on the movement of the card holder 29 can be prevented and the Y-axis drive motor 43 can be reliably operated without using a large device.

The card pressure lever 35 of the card holder 29 pushes down the middle lever 37 via the coil spring 36, so the holding force of the card can be fixed even if there is variation in the thickness of the card. This ensures high quality card processing by preventing displacement of the card.

As is apparent from FIG. 14, the card extractor 21 is moved below the card stacker 9. The card stacker part 1 is located on the opposite side of the card extracting and moving mechanism 2 from the engraving/embossing mechanism 5 and the topper mechanism 6. The card reader 3 is arranged on the extension of the card moving locus L1 (FIG. 2) by the X-axis moving mechanism 22, so the card stacker part 1, the engraving/embossing mechanism 5, the topper mechanism 6, the card reader 3, and the card extracting and moving mechanism 2 can be arranged rationally. Consequently, even if a plurality of card stackers 9 are arranged, the device as a whole can be miniaturized by eliminating dead space. This also shortens the moving route of the card and reduces the processing time.

As shown in FIG. 16, the waste card box 58 is movable between the withdrawal position P4 and the receiving position P3, so it is possible to freely execute normal movements of the carriage 26 by removing the waste card box 58 from the moving locus L1 of the card during normal card processing. The waste card box 58 is moved using the movement of the carriage 26, so a dedicated motor is not necessary. It is only necessary to provide a small solenoid 65 for engaging the pin lever 68 and the carriage 26.

The card engaging claw 45 is activated by the spring 85 and is rotatable with respect to the movable body 44 as shown in FIG. 15, so the card engaging claw does not separate from the card even if the card warps or bends.

A reactive force for pushing back the card engaging claw 45 is applied when the card extractor 21 is delivering the card. As shown in FIG. 15, the reactive force is applied in the direction of further strengthening the engagement of the card and the card engaging claw 45 based on the relationship of the attachment point of the card engaging claw to the movable body 44, the card hitching point of the card engaging claw, and the direction of the reactive force. Thus, even if the movement of the card is unusually heavy and a strong force is necessary for extraction, a force acts in the direction in which the card engaging claw 45 bites into the card, so the card engaging claw and the card do not disengage.

The card support 46 is provided to the movable body 44 as shown in FIG. 15, so it is possible to prevent the card engaging claw 45 from being pushed down by the second card from the bottom of a stacker and becoming separated from the bottommost card while extracting the bottommost card. Consequently, the cards can be extracted reliably.

As shown in FIG. 8, the card receiver is structured to support the bottommost card at three points, so the card can be extracted reliably from the card supply part 8 even if it is curved.

As shown in FIGS. 6 and 7, the side walls 9a–9d of the card stackers 9 are formed into a funnel shape, so refilling of cards becomes easy. Moreover, the side walls 9d arranged along adjacent card stackers are bent into the cut-out parts 15 of the adjacent side walls 9d. The stackers can be arranged with small spacing in between, and the device can be miniaturized. Further, four card stackers 9 are described in the above embodiment, but it is possible to provide two, three, five or more card stackers.

Figure 21:
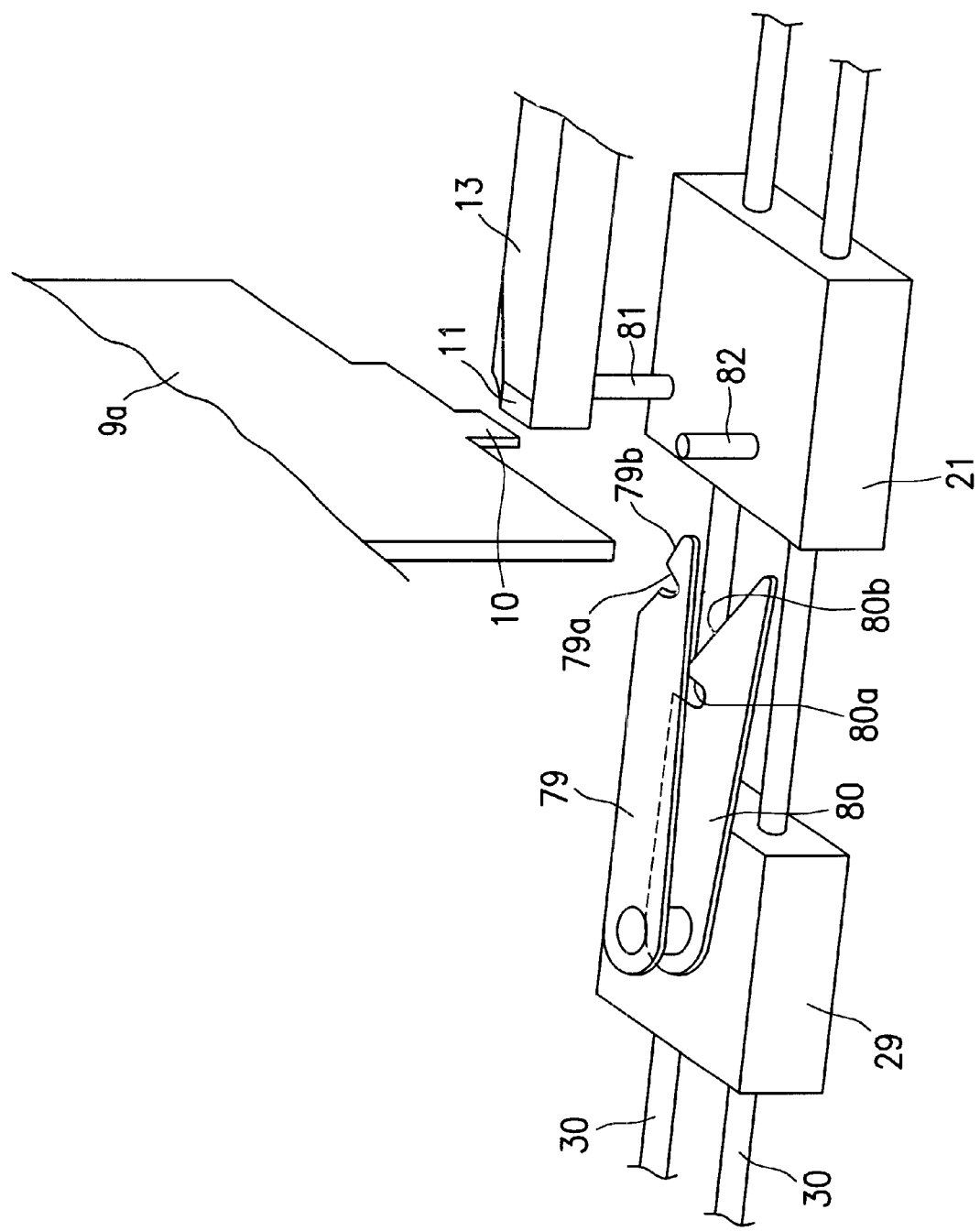
FIG. 21 is a perspective view showing another embodiment of the card holder.
Figure 22A:
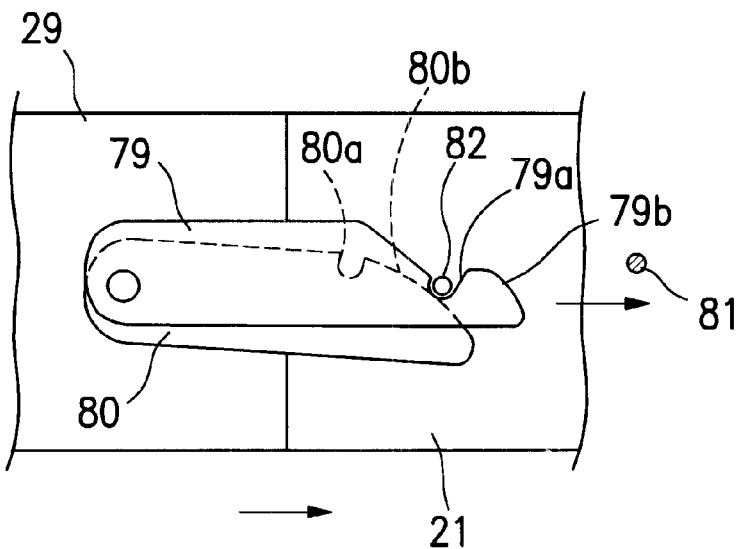
FIG. 22(a) is a top view of the card holding member coupled to the card extractor.
Figure 22B:
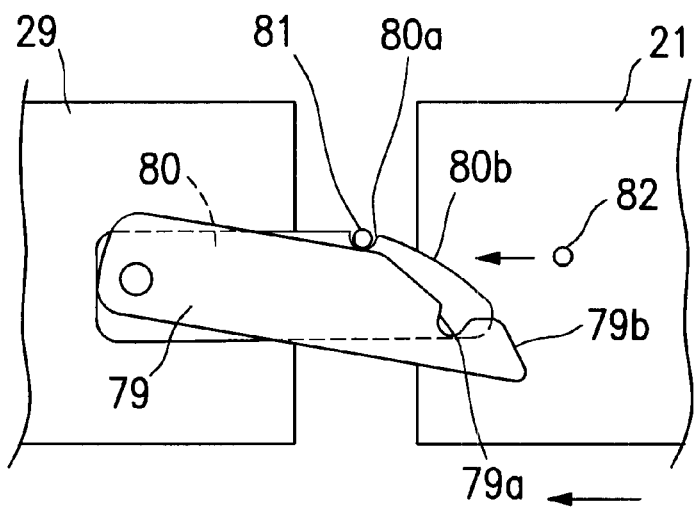
FIG. 22(b) is a top view of the card holder coupled to the card receiving block.
Figure 23:
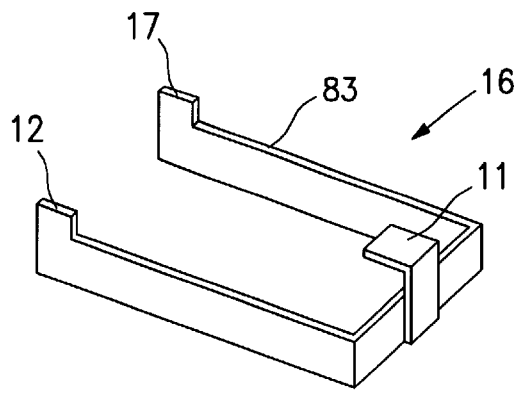
FIGS. 23–26 are perspective views of alternative embodiments of the card receiver.
Figure 24:
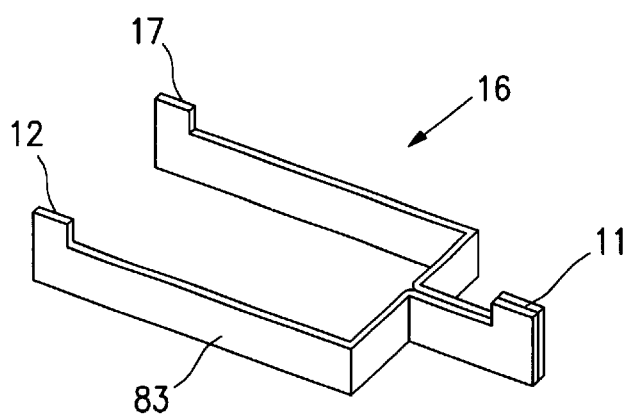
Figure 25:
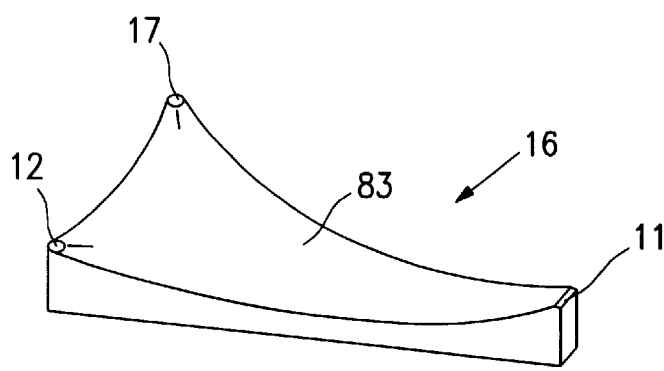
Figure 26:
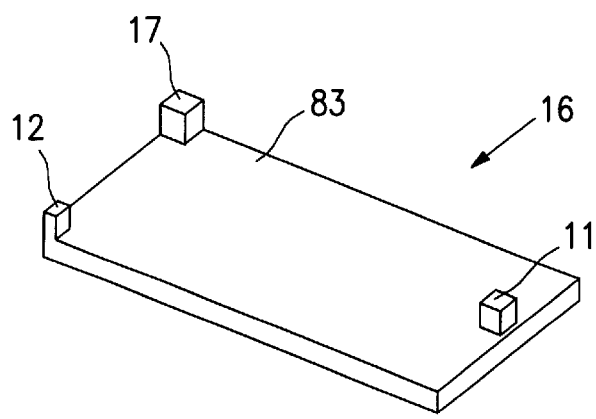

Moreover, the card holder 29 and the card extractor 21 are moved in unison by pulling the card holder 29 towards the card extractor 21 with a spring. However, for example, it is also possible for the card holder 29 and the card extractor 21 to be unified when the card extractor 21 approaches the card holder 29 by using two links 79 and 80 as shown in FIG. 21 and FIG. 22.

Thus, in addition to providing the top side pin 81 to the bottom face of the card receiving block 13 and the bottom side pin 82 to the top face of the card extractor 21, concave parts 79a and 80a are formed at different positions of the two links 79 and 80, and the links 79 and 80 are held parallel to the Y direction guide shaft 30 by a spring not shown in the figures. When moving the card extractor 21 towards the card stacker 9 from the engraving/embossing mechanism 5 side in order to extract a card, the bottom side pin 82 and the concave part 79a of the first link 79 are engaged, the card extractor 21 and the card holder are coupled, the card extractor 21 is pulled, and the card holder 29 moves in unison with the card extractor as shown in FIG. 22(*a*). Then, when it moves below the card stacker 9, the top side pin 81 strikes the slant face 79b, the first link 79 rotates, and the bottom side pin 82 and the concave part 79a disengage while the top side pin 81 engages with the concave part 80a of the second link 80. Therefore, the card holder 29 separates from the card extractor 21 and only the card extractor moves below the card stacker 9. On the other hand, the card holder 29 is coupled to the card receiving block 13. Then, when the card extractor 21 moves towards the engraving/embossing mechanism 5 side while extracting the next card, the bottom side pin 82 strikes the slope face 80b of the second link 80, the second link rotates, and the top side pin 81 and the concave part 80a disengage while the first link 79 is rotated by the top side pin 81 being returned by the spring, so the bottom side pin 82 engages with the concave part 79a of the first link 79 as shown in FIG. 22(*b*). Therefore, the card holder 29 is coupled to the card extractor 21 by separating from the card receiving block 13, and moves towards the strong pressure position P2 from the temporary holding position P1 by being pressed to the card extractor 21.

Although the card holder 29 holds the card (extracted with a weak force) by the top and bottom plate springs 41 as shown in FIG. 12, it is possible to have a plate spring only on the top side or the bottom side and for the plate spring to pressure the card with the other side as a reference.

In the embodiment described above, the waste card box 58 is moved by coupling the pulley 63 and the wire lever 71 of the waste card receiver 4 with the wire 66. Alternatively, it is possible to move the waste card box 58 by coupling it with a link or the like instead of the wire 66.

In the embodiment described above, the waste card box 58 having a cover 58a is used, but a waste card box 58 having no cover can also be used. Furthermore, it is possible to let the received card slide and be placed into a separately provided receiving box instead of the waste card box 58. In addition, the sensor that detects the presence or absence of cards in the waste card box 58 can be a photointerrupter or a microswitch. In the embodiment described above, the movement of the carriage 26 is transmitted selectively to the waste card box 58 by using the selective driving means 65 in the waste card receiver 4. Alternatively, it is possible to omit the selective driving means and transmit the movement of the carriage 26 to the waste card box 58 when the carriage is moved to a position to which it is not moved in a normal card processing operation. By moving the carriage 26 to such a position, it is necessary to extend the moving locus of carriage 26, but the number of actuators can be reduced since the selective driving means 65 can be omitted.

In the embodiment described above, the card receiving block 13 is provided below each card stacker 9 and the card receiver 16 supports the card at three points, namely, the convex parts 11 and 12 at two locations of the card receiving block 13 and the convex part 17 attached to the side wall 9b of the card stacker 9. An alternative card receiver 16 may support the card at three point by attaching a card receiving body 83 having three convex parts 11, 12, and 17 to the bottom part of the card stacker 9 as shown in FIGS. 23–26.

Figure 27:
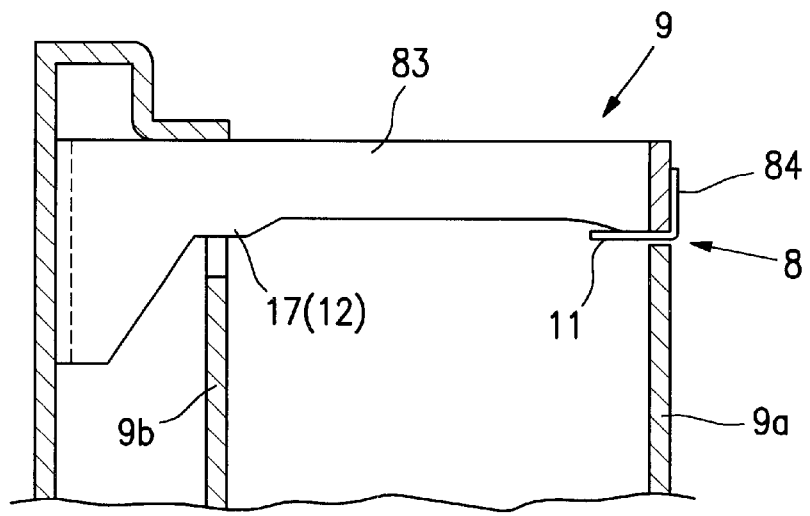
FIG. 27 is a cross-sectional view showing another embodiment of the card stacker.
Figure 28:
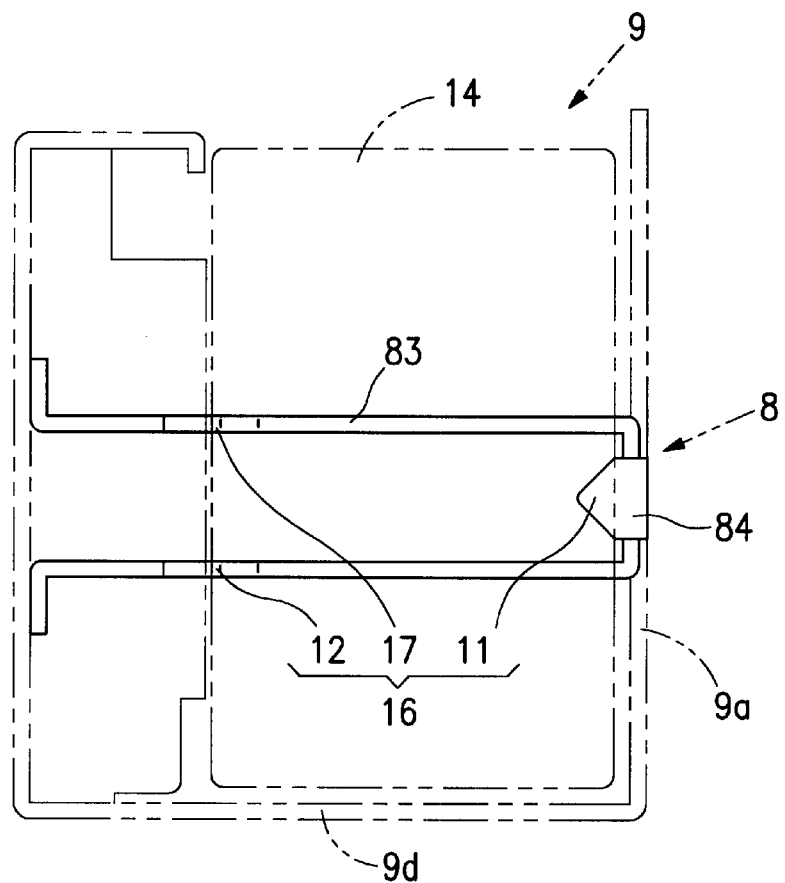
FIG. 28 is a view looking at the card receiver of the card stacker in FIG. 27 from the bottom side.
Figure 29:
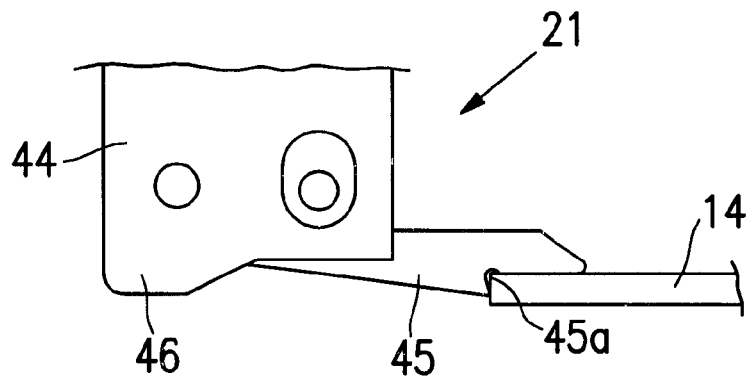
FIG. 29 is an enlarged front view showing the card extractor used in the card stacker in FIG. 27.

In the embodiment described above, the card stacks 9 are a type in which the cards are refilled from above and extracted from a card supply part provided below the side walls. An alternative type of card stackers may be used, in which the cards are refilled from below and extracted from a card supply part provided above the side walls. In this case, the card receiver has, for example, a convex part 11 formed on a plate 84 attached to the card receiving body 83, and convex parts 12 and 17 formed on the card receiving body 83 and arranged facing down as shown in FIGS. 27 and 28. The card engaging claw 45 which grasps and extracts the card is attached to the movable body 44 and rotatable under its own weight as shown in FIG. 29. Namely, it does not have a spring 85 as is shown in FIG. 15. The card engaging claw 45 rotates under its own weight even if it does not have a spring 85, so it can conform to the curvature of the card. In this case, the cards in the card stackers 9 are lifted by an elevator mechanism (not shown).

In the embodiment described above, the engraving/embossing mechanism 5 is provided for marking characters on the card. Alternatively, an engraving mechanism with a heated pen instead of an engraving/embossing mechanism can be used. In this case, the topper mechanism 6 can be omitted since the characters can be colored by the engraving mechanism.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein. The accompanying claims are intended to cover such and other modifications as would fall within the true scope and spirit of the present invention.

We claim:

1. A card issuing device comprising:
   a plurality of card stackers for storing cards, each card stacker having a card supplying part for supplying the stored cards one at a time;
   a card reader having a recording part for recording information on the card, and a card issuing port for issuing the card;
   a card extracting and moving mechanism movably provided for extracting one card at a time from anyone of the card stackers and for transporting the extracted card to the card reader; and
   a control part for controlling the card extracting and moving mechanism and the card reader; wherein the card extracting and moving mechanism includes a first moving mechanism for moving the card in a first direction and a second moving mechanism for moving the card in a second direction substantially perpendicular to the first direction;
   wherein the card issuing device further comprises a detector for detecting an edge of the card held by the card extracting and moving mechanism, and a marker for marking characters on the card; and
   wherein the control part controls the card extracting and moving mechanism to move the card to the marker, controls the detector to detect the inclination of the card held by the card extracting and moving mechanism with respect to the first direction, and controls the first and second moving mechanisms to move the card during a marking process based on the detected inclination of the card.

2. The card issuing device of claim 1, wherein the card supplying parts of the plurality of card stackers are arranged in the same plane and supply the cards in the same direction.

3. The card issuing device of claim 2, wherein the plurality of card stackers are arranged in a row in a first direction, and the card supplying parts supply the cards in a second direction substantially perpendicular to the first direction.

4. The card issuing device of claim 1, wherein the card extracting and moving mechanism comprises:
   a card extractor for extracting the cards from the card stackers;
   a card holder for holding the extracted card;
   a first moving mechanism for moving the card extractor and the card holder in a first direction; and
   a second moving mechanism for moving the card extractor in a second direction substantially perpendicular to the first direction to extract the cards from the card supplying parts.

5. The card issuing device of claim 4, wherein the card reader includes a card transporter for transporting the card in the first direction into the card reader.

6. The card issuing device of claim 4, further comprising an engraving/embossing mechanism for marking characters on the card.

7. The card issuing device of claim 6, further comprising a topper mechanism, the topper mechanism being moveable towards and away from the first moving mechanism.

8. The card issuing device of claim 6, wherein the first moving mechanism is located between the card stackers and the engraving/embossing mechanism.

9. The card issuing device of claim 8, wherein the engraving/embossing mechanism comprises:
   a movable member having a plurality of opposing pressing members provided thereon; and
   a press driving mechanism which drives the pressing members located at a specified position to mark the card.

10. The card issuing device of claim 1, wherein the inclination of the card is detected by detecting at least two edge positions along an edge of the card.

11. The card issuing device of claim 10, wherein the detector includes a photosensor.

12. A card issuing method comprising:
    storing a plurality of cards in each of a plurality of card stackers;
    extracting a card from any selected one of the plurality of card stackers using a card extracting and moving mechanism;
    marking a plurality of characters on the extracted card;
    holding the card so that a predefined edge of the card is approximately parallel to a first direction of movement;
    detecting an angle between the predefined edge and the first direction; and
    before marking each subsequent character, moving the card in the first direction and a second direction substantially perpendicular to the first direction based on the detected angle so that the plurality of marked characters form a row parallel to the predefined edge;
    transporting the extracted card to a card reading device using the card extracting and moving mechanism;
    recording information on the extracted card using the card reading device; and
    issuing the card.

13. The card issuing method of claim 12, wherein the cards stored in each card stacker are of the same type and at least two types of card are stored in the plurality of card stackers.

14. The card issuing method of claim 12, wherein the cards stored in all card stackers are the same type of cards.

15. A card marking method for marking a plurality of characters on a card, comprising:
    holding the card so that a predefined edge of the card is approximately parallel to a first direction of movement;
    detecting an angle between the predefined edge and the first direction, wherein detecting comprises detecting the edge positions at two locations along the predefined edge, wherein detecting the edge positions further comprises moving the card in the second direction with respect to a photosensor so that the card intercepts the photosensor;
    marking the plurality of characters on the card, wherein the marking comprises engraving and/or embossing the characters on the card; and
    before marking each subsequent character, moving the card in the first direction and a second direction substantially perpendicular to the first direction based on the detected angle so that the plurality of marked characters form a row parallel to the predefined edge.

* * * * *